US012613968B2

(12) United States Patent
Walsh et al.

(10) Patent No.: US 12,613,968 B2
(45) Date of Patent: Apr. 28, 2026

(54) SYSTEMS AND METHODS FOR COMMUNICATION OF DATA WITH ISOLATED ENVIRONMENTS

(71) Applicant: Parry Labs, LLC, Alexandria, VA (US)

(72) Inventors: David Walsh, Alexandria, VA (US); Charles Adams, Cedar Rapids, IA (US)

(73) Assignee: Parry Labs, LLC, Alexandria, VA (US)

( * ) Notice: Subject to any disclaimer, the term of this patent is extended or adjusted under 35 U.S.C. 154(b) by 0 days.

(21) Appl. No.: 18/889,331

(22) Filed: Sep. 18, 2024

(65) Prior Publication Data

US 2026/0080061 A1 Mar. 19, 2026

(51) Int. Cl.
| | |
|---|---|
| *G06F 21/55* | (2013.01) |
| *G06F 13/18* | (2006.01) |
| *G06F 21/54* | (2013.01) |
| *G06F 21/57* | (2013.01) |

(52) U.S. Cl.
CPC .............. *G06F 21/57* (2013.01); *G06F 13/18* (2013.01); *G06F 21/54* (2013.01)

(58) Field of Classification Search
CPC ........... G06F 21/57; G06F 13/18; G06F 21/54
USPC ......................................... 726/25
See application file for complete search history.

(56) References Cited

U.S. PATENT DOCUMENTS

| | | | | | |
|---|---|---|---|---|---|
| 6,013,108 | A * | 1/2000 | Karolys | ................. | G01D 3/022 |
| | | | | | 710/72 |
| 8,498,941 | B2 * | 7/2013 | Felsher | .............. | G06F 21/6245 |
| | | | | | 705/51 |
| 9,426,652 | B2 * | 8/2016 | Nutaro | .................. | G06F 21/606 |
| 11,689,386 | B2 * | 6/2023 | Lee | ..................... | H04J 14/0294 |
| | | | | | 714/4.11 |
| 2005/0204155 | A1 * | 9/2005 | Ravi | ....................... | G06F 21/79 |
| | | | | | 726/22 |
| 2008/0037880 | A1 * | 2/2008 | Lai | ......................... | H04N 19/64 |
| | | | | | 375/240 |
| 2008/0320311 | A1 * | 12/2008 | Cho | ..................... | H04L 9/3247 |
| | | | | | 713/187 |
| 2017/0139869 | A1 * | 5/2017 | Block | ................. | G06F 11/1004 |
| 2017/0262668 | A1 * | 9/2017 | Lim | ........................ | H04W 4/80 |
| 2018/0107473 | A1 * | 4/2018 | Ahmed | .................. | G06F 8/654 |
| 2020/0234198 | A1 * | 7/2020 | Feng | .................. | G06F 21/6245 |

(Continued)

FOREIGN PATENT DOCUMENTS

| | | |
|---|---|---|
| CN | 106656709 A | 5/2017 |
| CN | 106886424 B | 8/2021 |

(Continued)

*Primary Examiner* — Taghi T Arani
*Assistant Examiner* — Pegah Barzegar
(74) *Attorney, Agent, or Firm* — Caldwell LLC

(57) ABSTRACT

A system for communication of data with isolated environments, the system including at least a processor and a memory communicatively connected to the at least a processor, the memory containing instructions configuring the at least a processor to receive one or more transmission datum from an operating environment, wherein the operating environment conforms with at least one design assurance level (DAL) classification, modify the one or more transmission datum as a function of the at least one DAL classification and transmit the one or more transmission datum through an intelligent bus controller as a function of the modification.

20 Claims, 7 Drawing Sheets

(56)     References Cited

U.S. PATENT DOCUMENTS

| 2021/0034042 | A1* | 2/2021 | Lee | .................. | G05B 19/41855 |
| 2021/0182383 | A1* | 6/2021 | Dervin | .................. | G11C 29/16 |
| 2022/0068299 | A1* | 3/2022 | Iwasaki | ................ | G11B 5/3116 |
| 2022/0224724 | A1* | 7/2022 | Bazalgette | .......... | H04L 63/1441 |
| 2022/0358241 | A1* | 11/2022 | Palakodety | ............ | G16H 15/00 |
| 2022/0374519 | A1* | 11/2022 | Botelho | ............. | G06F 11/1464 |
| 2024/0362349 | A1* | 10/2024 | Babani | ................ | G06F 21/6218 |

FOREIGN PATENT DOCUMENTS

| CN | 115021942 | | * | 9/2022 | |
| KR | 102276801 | | * | 2/2021 | |
| KR | 102276801 | B1 | * | 7/2021 | .......... G06F 11/3089 |
| WO | 2014206451 | A1 | | 12/2014 | |

* cited by examiner

600

605 Receiving, By at Least a Processor, One or More Transmission Datum

610 Modifying, By the At Least a Processor, the One or More Transmission Datum

615 Transmitting, By the At Least a Processor, the One or More Transmission Datum

SYSTEMS AND METHODS FOR COMMUNICATION OF DATA WITH ISOLATED ENVIRONMENTS

FIELD OF THE INVENTION

The present invention generally relates to the field of virtual machines. In particular, the present invention is directed to systems and methods for communication of data with isolated environments.

BACKGROUND

Operating environments may be isolated from a host operating system in order to ensure independence of a software within the operating environments from the host system. Isolation may ensure that data generated within the operating environment is protected from unwanted tampering. However, current systems utilizing operating environments for isolation, lack the proper structure in order to prevent the tampering of data during transmission. In addition, current systems capable of transmission lack the capabilities to dynamically allocate the priority of data being transmitted.

SUMMARY OF THE DISCLOSURE

In an aspect, a system for communication of data with isolated environments is described. The system includes at least a processor and a memory communicatively connected to the at least a processor. The memory contains instructions configuring the at least a processor to receive one or more transmission datum from an operating environment, wherein the operating environment conforms with at least one design assurance level (DAL) classification, modify the one or more transmission datum as a function of the at least one DAL classification and transmit the one or more transmission datum through an intelligent bus controller as a function of the modification.

In another aspect, a method for communication of data with isolated environments is described. The method includes receiving, by at least a processor, one or more transmission datum from an operating environment, wherein the operating environment conforms with at least one design assurance level (DAL) classification, modifying, by the at least a processor, the one or more transmission datum as a function of the at least one DAL classification and transmitting, by the at least a processor, the one or more transmission datum through an intelligent bus controller as a function of the modification.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
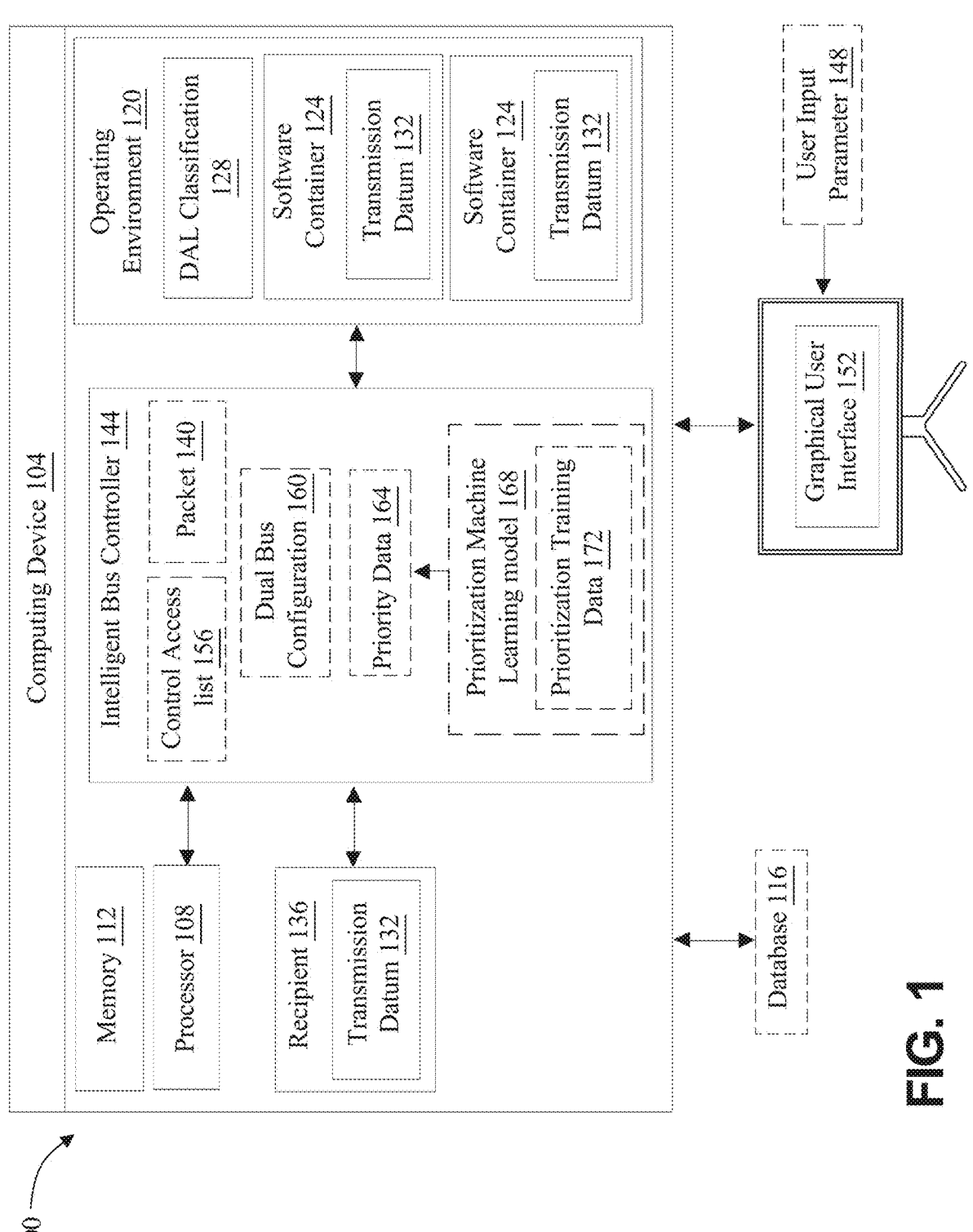
FIG. 1 is a block diagram of an exemplary embodiment of a system for communication of data with isolated environments.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for communication of data with isolated environments. In an embodiments aspects of this disclosure can be used to ensure proper transmission of data in situations that cannot tolerate system failures. In an embodiment, isolated environments, such as operating environments may communicate with external environments using a messaging bus. The messaging bus may support various communication patterns including point-to-point, request/response and the like. Messaging bus may allow for communication between distributed systems. In an aspect, data may be transferred onto the bus for communication with other components with the system. This may include instructions for processing, control signals and/or any other data. When data is dumped onto a bus it may follow a protocol or format that allows other components or systems to interpret the information. Data may be sourced from various sources such as the CPU, the product and the like. Bus controller software, Device drivers, kernel and the like may be responsible for data transfer to and/or from the Bus. The software determines if the Bus is available for communication, encodes the data into a proper format and send it across the Bus. The software may also control the Bus protocol which determines how the data is transferred. In an embodiment, the timing and sequence of data transfer and communication may allow for consistency and predictability.

Aspects of the present disclosure can be used to communicate information from isolated environments into external environments. In an embodiments, aspects of this disclosure may allow for secure data transmission wherein recipients are identified and authorized prior to transmission. Exemplary embodiments illustrating aspects of the present disclosure are described below in the context of several specific examples.

In an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0" the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Continuing to refer to FIG. 1, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. In a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Keys may be generated by random variation in selection of prime numbers, for instance for the purposes of a cryptographic system such as secret that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Cryptographic system may be configured to generate a session-specific secret. Session-specific secret may include a secret, which may be generated according to any process as described above, that uniquely identifies a particular instance of an attested boot and/or loading of software monitor. Session-specific secret may include without limitation a random number. Session-specific secret may be converted to and/or added to a secure proof, verification datum, and/or key according to any process as described above for generation of a secure proof, verification datum, and/or key from a secret or "seed"; session-specific secret, a key produced therewith, verification datum produced therewith, and/or a secure proof produced therewith may be combined with module-specific secret, a key produced therewith, a verification datum produced therewith, and/or a secure proof produced therewith, such that, for instance, a software monitor and/or other signed element of attested boot and/or attested computing may include secure proof both of session-specific secret and of module-specific secret. In an embodiment, session-specific secret may be usable to identify that a given computation has been performed during a particular attested session, just as device-specific secret may be used to demonstrate that a particular computation has been produced by a particular device. This may be used, e.g., where secure computing module and/or any component thereof is stateless, such as where any such element has no memory that may be overwritten and/or corrupted.

Referring now to FIG. 1, a system 100 for communication of data with isolated environment is described. System 100 includes a computing device 104. System 100 includes a processor 108. Processor 108 may include, without limitation, any processor 108 described in this disclosure. Processor 108 may be included in a and/or consistent with computing device 104. In one or more embodiments, processor 108 may include a multi-core processor. In one or more embodiments, multi-core processor may include multiple processor cores and/or individual processing units. "Processing unit" for the purposes of this disclosure is a device that is capable of executing instructions and performing calculations for a computing device. In one or more embodiments, processing unit may be included within a processor, a core of a processor, an FPGA IP core such as picoblaze, and the like. In one or more embodiments, processing units may retrieve instructions from a memory, decode the data, secure functions and transmit the functions back to the memory. In one or more embodiments, processing units may include an arithmetic logic unit (ALU) wherein the ALU is responsible for carrying out arithmetic and logical operations. This may include, addition, subtraction, multiplication, comparing two data, contrasting two data and the like. In one or more embodiment, processing unit may include a control unit wherein the control unit manages execution of instructions such that they are performed in the correct order. In none or more embodiments, processing unit may include registers wherein the registers may be used for temporary storage of data such as inputs fed into the processor and/or outputs executed by the processor. In one or more embodiments, processing unit may include cache memory wherein memory may be retrieved from cache memory for retrieval of data. In one or more embodiments, processing unit may include a clock register wherein the clock register is configured to synchronize the processor with other computing components. In one or more embodiments, processor 108 may include more than one processing units having at least one or more arithmetic and logic units (ALUs) with hardware components that may perform arithmetic and logic operations. Processing units may further include registers to hold operands and results, as well as potentially "reservation station" queues of registers, registers to store interim results in multi-cycle operations, and an instruction unit/control circuit (including e.g. a finite state machine and/or multiplexor) that reads op codes from program instruction register banks and/or receives those op codes and enables registers/arithmetic and logic operators to read/output values. In one or more embodiments, processing unit may include a floating-point unit (FPU) wherein the FPU is configured to handle arithmetic operations with floating point numbers. In one or more embodiments, processor 108 may include a plurality of processing units wherein each processing unit may be configured for a particular task and/or function. In one or more embodiments, each core within multi-core processor may function independently. In one or more embodiments, each core within multi-core processor may perform functions in parallel with other cores. In one or more embodiments, multi-core processor may allow for a dedicated core for each program and/or software running on a computing system. In one or more embodiments, multiple cores may be used for a singular function and/or multiple functions. In one or more embodiments, multi-core processor may allow for a computing system to perform differing functions in parallel. In one or more embodiments, processor 108 may include a plurality of multi-core processors. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently or may include two or more computing devices operating in concert, in parallel, sequentially or the like; two or more computing devices may be included together in a single computing device 104 or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices in a first location and a second computing device 104 or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory 112 between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, system 100 includes a memory 112 communicatively connected to processor 108, wherein the memory 112 contains instructions configuring processor 108 to perform any processing steps as described herein. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 112 may include a primary memory and a secondary memory. "Primary memory" also known as "random access memory" (RAM) for the purposes of this disclosure is a short-term storage device in which information is processed. In one or more embodiments, during use of computing device 104, instructions and/or information may be transmitted to primary memory wherein information may be processed. In one or more embodiments, information may only be populated within primary memory while a particular software is running. In one or more embodiments, information within primary memory is wiped and/or removed after computing device 104 has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 108 may access the information from primary memory.

Still referring to FIG. 1, System 100 may include a database 116. Database may include a remote database 116. Database 116 may be implemented, without limitation, as a relational database, a key-value retrieval database such as a NOSQL database, or any other format or structure for use as database that a person skilled in the art would recognize as suitable upon review of the entirety of this disclosure. Database may alternatively or additionally be implemented using a distributed data storage protocol and/or data structure, such as a distributed hash table or the like. Database 116 may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, system 100 may include and/or be communicatively connected to a server, such as but not limited to, a remote server, a cloud server, a network server and the like. In one or more embodiments, computing device 104 may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by system computing device 104. In one or more embodiments, computing device 104 may transmit processes to server wherein computing device 104 may conserve power or energy.

With continued reference to FIG. 1, system 100 may include a host circuit. Host circuit includes at least a processor 108 communicatively connected to a memory 112. As used in this disclosure, a "host circuit" is an integrated circuit or a collection of interconnected circuits designed to manage, control, and/or interface with one or more operating environments or operating systems in a system. In a non-limiting example, host circuit may be configured as a primary platform or base that provides essential infrastructure, resources, and interfaces to facilitate the operation of other connected or integrated components. Hosting circuit may include any computing device as described in this disclosure, including without limitation a microcontroller, microprocessor, digital signal processor (DSP) and/or system on a chip (SoC) that provide one or more services, resources, or data to other computing devices. Host circuit may include, be included in, and/or communicate with a mobile device such as a mobile telephone or smartphone. Host circuit may include a single computing device operating independently, or may include two or more computing device operating in concert, in parallel, sequentially or the like; two or more computing devices may be included together in a single computing device or in two or more computing devices. In some cases, Host circuit may include but is not limited to, for example, a computing device or cluster of computing devices in a first location and a second computing device or cluster of computing devices in a second location. In other cases, host circuit may include a main unit or a primary circuit in a network that controls communications and/or provide a central point of interface. In one or more embodiments, host circuit may be used in lieu of computing device 104. In one or mor embodiments, host circuit may carry out one or more processes as described in this disclosure intended for computing device 104.

With continued reference to FIG. 1, in or more embodiments, system 100 may implement one or more aspects of Future Airborne Computing Environment (FACE). As used in this disclosure, a "Future Airborne Computing Environment" is a technical standard and business strategy for promoting acquisition of open systems software architecture in aviation industry, specifically for military avionics system. In some cases, system 100 may employ FACE approach, wherein a computing device may run in a common operating environment to support one or more portable capability software applications across a plurality of department of defense (DoD) avionics systems. In some cases, FACE may include a plurality of software application programming interfaces (APIs) grouped into "segments." In a non-limiting example, FACE may include operating system segments (OSS), platform specific services segment (PSSS), I/O service segment, transport services segment, and/or the like. In some cases, FACE may allow for the isolation of software items and APIs from surrounding operating environments and/or surrounding operating systems. In some cases, system 100 may include one or more extensions to FACE that satisfy safety assumptions in hardware outside FACE Boundary. In a non-limiting example, FACE may include a plurality of API groups (i.e., segments), wherein one or more API groups may be dependencies for avionics functional software (i.e., portable component segment [PCS]) to be deployed to FACE. In some cases, such avionics functional software may not need any dependencies. Additionally, or alternatively, FACE may also anticipate one or more hardware resources which software (i.e., portable component segment deployed within the FACE Boundary) may or may not require to satisfy their hardware assumptions and/or dependencies. In a non-limiting example, FACE may include a health monitoring monitor, interface hardware such as Ethernet device driver (within operating system segment) configured to infer specific hardware assumptions.

With continued reference to FIG. 1, system 100 may include an operating environment 120. An "operating environment" for the purposes of this disclosure refers to the combination of hardware and software that allows a computer software to function or execute. For example, and without limitation, operating environment 120 may include an operating system, device drivers, virtual machines, software containers 124, software modules, executable programs and the like. In one or more embodiments, operating environment 120 may allow for the execution of computer software. In one or more embodiments, operating environments 120 may allow for the execution of software modules and/or software containers 124. In one or more embodiments, software container 124 may include any container as described in reference to at least FIG. 2. In one or more embodiments, software container 124 may include a container image. A "software image," also known as a "container image," as described herein, is a snapshot or a packaged representation of an entire software state, including executable code, configurations, dependencies/libraries, and other required data. In some cases, software image may include source code, libraries, and other software components that the software relies on. In some cases, software image may include one or more configuration files which define a plurality of settings, parameters, and other configurations for the software. In some cases, configuration files may include certain OS configurations, environmental variables, or other system-level settings. In a non-limiting example software image may include a portable executable image combined with a manifest file that is used by a container manager as described below to deploy the software image on an operating environment 120 with appropriate data services and restrictions. In some cases, software image may be used to package a software application with its entire collection of dependencies, ensuring that the software application can run consistently across different SOEs. Exemplary software applications may include, without limitation, flight management system (FMS) software, air traffic control (ATC) software, avionics systems 120, electronic flight bag (EFB) software, ground support equipment software, weather forecasting and reporting software, cockpit display rendering software, and/or the like. In some cases, software image may include a virtual machine image that encapsulate a whole operating system along with one or more pre-installed software applications. Such software may be easily replicated across a plurality of host circuits e.g., servers or cloud environment. In other cases, software image may be used as a backup snapshot to restore/roll back system or a software application to a known working state. A "software module" for the purposes of this disclosure, is an application or software that is sought to be executed. For example, and without limitation, software module may include a web browser, word processing software, a media player, a digital calculator, flight systems software, military software and the like. In one or more embodiments, software module may include an application that is sought to be executed within software container 124. In one or more embodiments, any data and/or information within software container 124 may be used to ensure proper execution of software module. In one or more embodiments, software container 124 may contain libraries, dependencies, and the like to ensure proper execution of software module. In one or more embodiments, software module may include an executable file. In one or more embodiments, software module may include third party application wherein 3$^{rd}$ party applications may include software and/or application created and/or managed by a differing entity. In one or more embodiments, software module may include previously developed applications wherein the previously developed application are modified to interact with a particular environment. In one or more embodiments, software container 124 may allow for a third-party application and/or previously developed application to be deployed within multiple virtual environments and/or operating system. In one or more embodiments, software module may include a previously developed application and/or 3$^{rd}$ party application wherein software module may be placed within software container 124 to allow for software module to operate within multiple environments. A "software container" for the purposes of this disclosure is an executable package that is capable of running software within an isolated space. For example, and without limitation, software container 124 may include a document drafting software wherein the software container 124 may contain any information, runtime environment and the like necessary to execute the document drafting software on more than one operating systems. In one or more embodiments, software containers 124 may create a virtualized environment wherein a software may run within the virtualized environment. In one or more embodiments, operating environment 120 may include a virtualized environment. A "virtualized environment," for the purposes of this disclosure is a system in which software may be isolated while still operating on a host operating system. For example, and without limitation, software container 124 may operate in a virtualized environment wherein a software within software container 124 may not communicate with the host operating system. In one or more embodiments, software container 124 may allow for OS virtualization wherein a software may be isolated from a host operating system while still sharing the host operating system kernel. An "operating system (OS) level virtualization," for the purposes of this discourse is a system in which an operating system kernel allows the existence of multiple isolated environment. In OS virtualization, a software within software container 124 may not have access to resources of the host operating system. Instead, the software may only have access to the contents within software container 124. In one or more embodiments, operating environment 120 may include a host operating system. In one or more embodiments, operating environment 120 may include a virtual machine and/or virtual environment operating on host operating system. A "host operating system" for the purposes of this disclosure is a primary operating system running on processor 108. In one or more embodiments, software container 124 may be executed on top of host operating system. In one or more embodiments, virtual operating systems may exist on top of host operating system. In one or more embodiments, host operating system may include an operating system configured to allow instantiation of one or more software containers 124, one or more virtual machines and the like. In one or more embodiments, software container 124 may communicate with host operating system to receive resources from processor 108 and/or memory. In one or more embodiments, an ordinary software operating outside of a software container 124 may have access to various operating system resources such as but not limited to, processing capabilities, file systems, networks and the like. In contrast, a software operating within a software container 124 may only have access to the contents within the software container 124. This may include various files, network capabilities and the like. In one or more embodiments, a software within software container 124 may communicate with software container 124 wherein software container 124 may transmit the commands to the processor 108. In one or more embodiments, software container 124 may contain application-level virtualization. "Application-level virtualization" for the purposes of this disclosure is a system in which a software may be completely encapsulated from a host operating system such that the software may not share the host operating system kernel. In one or more embodiments, in application-level virtualization an application may be encapsulated within a virtual environment as described in further detail below. In one or more embodiments, in application-level virtualization an application may communicate through a virtualization layer such as one created by a hypervisor. In one or more embodiments, application virtualization may include a process in which the application does not rely on the host operating system kernel. In one or more embodiments, software container 124 may contain OS level virtualization wherein a software within software container 124 may be executed in a virtualized environment. In one or more embodiments, software container 124 may contain application virtualization wherein a software may be executed on multiple differing operating systems. In one or more embodiments, in an OS level virtualization, a software may be dependent on the host operating system kernel wherein in an application virtualization, the software may run independent of the host operating system kernel. In one or more embodiments, software container 124 may isolate an application from a surrounding environment wherein the software may operate in a runtime environment. In one or more embodiments, the runtime environment includes everything necessary to allow for isolation of a software from the host operating system. This may include but is not limited to, application and/or software code, dependencies, runtime components needed to execute the application such as access to a database 116, and the like. In one or more embodiments, a software within software container 124 may operate in a runtime environment wherein the software may be isolated from the host operating system. In one or more embodiments, software container 124 may allow for an application to be executed and/or deployed on multiple operating systems. In one or more embodiments, software container 124 may contain libraries, configuration files, binary code and/or any other information that is necessary to execute the application and/or software. In one or more embodiments, a software container 124 may contain some degree of independence from the operating system and/or host system wherein the software container 124 does not rely on the operating system for any information needed to properly deploy an application within software container 124. In one or more embodiments, operating systems may lack the proper functionalities to execute an application, wherein software container 124 may be used to ensure that any necessary functionalities, information, and the like are self-contained. In one or more embodiments, software container 124 may contain a container image, wherein the container image is a portable executable image combined with a manifest that is used by a container manager to deploy the container image on an operating environment 120 with appropriate data services and restrictions. In one or more embodiments, software container 124 may contain restrictions and/or instructions on how a software may communicate with the operating system in which it is deployed on. In one or more embodiments, software container 124 may contain a container manager, wherein the container manager has the ability to deploy container images on the operating system. The container manager may interface with container image repositories, validate the authenticity of container images, load container executables into container environments, connect container environments to operating service, and exports management application user interfaces (API) to system management tools.

With continued reference to FIG. 1, operating environment 120 may include, conform and/or be associated with a design level (DAL) classification 128. A "design assurance level classification," for the purposes of this disclosure in a labeling of software based on the effects caused by a failure of the software. For example, and without limitation, a software failure associated with a first software which can potentially put human lives at risk may receive a particular classification whereas a software failure associated with a second software which may, at most, slightly injure an individual may be given a differing classification. In one or more embodiments, each software may be associated with a particular DAL. DAL classification 128 may range from A-E wherein a DAL-A classification may indicate the software may cause death during failure, whereas as a DAL-E classification may indicate that there is no potential harm in the event of a software failure. In one or more embodiments, various software may be given classifications based on their inherent risk to cause harm to individuals. In one or more embodiments, the DAL of a software may indicate that one software may require more testing, safety protocols and the like in comparison to other software. For example, a DAL-E classified software may not require much testing as failure may not harm individuals, whereas a DAL-A may require stringent testing to ensure that failure does not occur. In one or more embodiments, each DAL certification may contain minimum resource requirements such as minimum processing power, minimum space allocation, and the like. In one or more embodiments, operating environment 120 may contain a DAL certification similar to that of the software and/or software container that is to be modified. In one or more embodiments, a software container may contain software associated with aviation and/or military technology, wherein each software container may contain DAL classification 128. For example, and without limitation, a software container may include software such as engine control systems, inflight entertainment, missile guidance systems, fuel monitoring systems and the like. In one or more embodiments, DAL classification 128 may indicate a level of importance of operating environment 120 and/or a particular software within operating environment 120. In one or more embodiments, operating environment 120 may include a plurality of software and/or software containers 124 wherein each software and/or software container 124 may contain an associated DAL classification 128.

With continued reference to FIG. 1, DAL classification 124 may include a DAL-A classification. In one or more embodiments, systems with DAL-A classifications may include systems whose failure could result in catastrophic consequences such as but not limited to, serious bodily harm, death, the loss of an aircraft and the like. In an embodiment, systems with DAL-A classification may include systems such as flight control systems, structural components of a system, landing gear and the like. In an embodiment, DAL-A classification may indicate that a system requires the highest priority of attention and/or protection. In one or more embodiments, systems with DAL-A classifications may require redundancy wherein the failure of one component may still allow for the system to operate. In one or more embodiments, systems with DAL-A classifications may require intense monitoring protocols in order to quickly detect and address failures.

With continued reference to FIG. 1, DAL classification 124 may include a DAL-B classification. In one or more embodiments, systems classified with a DAL-B classification may include systems that can result in hazardous consequences but have not been elevated to the level of catastrophic. In one or more embodiments, systems with DAL-B classifications may result in harm if the system were to fail, however death or serious bodily injury may not occur. In one or more embodiments, systems with DAL-B classification may still require redundancy may require less care or supervision in comparison to DAL-A classifications. Examples of systems with DAL-B classifications may include but are not limited to, engine control systems, cabin pressurization systems, backup flight control systems and the like.

With continued reference to FIG. 1, in one or more embodiments, DAL classification may further include a DAL-C classification. In one or more embodiments, systems with DAL-C classifications may include systems that result in major consequences but do not amount to the level of hazardous. In one or more embodiments, systems with DAL-C classifications may require moderate levels of care and may not have redundancy protections implemented. In one or more embodiments, systems with DAL-C classification may include but are not limited to, passenger entertainment systems, environmental control systems and the like.

With continued reference to FIG. 1, DAL classification 124 may include a DAL-D classification. In one or more embodiments, systems with a DAL-D classification may include systems that are non-critical. In one or more embodiments, system with DAL-D classifications might result in inconvenience or discomfort in the event of a failure but will not cause harm. In one or more embodiments, systems with DAL-D classifications may include system such as but not limited to, interior lighting, non-critical display and passenger amenities. In one or more embodiments, DAL classification may further include a DAL-E classification. In one or more embodiments, systems with DAL-E classification may include systems that do not contribute to any potential harm. In one or more embodiments, systems with DAL-E classification may require little supervision, if any, and may be seemingly unnoticeable in the event of a failure.

With continued reference to FIG. 1, operating environments 120 and/or software within operating environments 120 may be assigned a DAL classification 124. In one or more embodiments, DAL classification may be assigned by a user, military personnel and the like. In one or more embodiments, processor 108 may assign DAL classification to each operating environment 120 and/or software therein. In one or more embodiments, processor 108 may determine DAL classification by determining the functionality of the operating environment. For example, and without limitation, software that directly affect flight control, structural integrity and/or other aircraft safety may be given a higher DAL classification whereas software associated with entertainment and/or other non-consequential matters may be given a lower classification. In one or more embodiments, processor 108 may further determine a potential effect of failure of operating environment 120 wherein a potential of harm may be given a higher classification and lack of harm may be given lower classifications. In one or more embodiments, processor 108 may determine the level of redundancy within operating environment 120 wherein higher levels of redundancy may indicate that the operating environment is used for an important purposes. In one or more embodiments, processor 108 may search database 116 for regulatory requirements wherein regulatory requirements may automatically assign DAL classification 124 to particular systems or groupings of systems.

With continued reference to FIG. 1, processor 108 is configured to receive one or more transmission datum 132 from operating environment 120. A "transmission datum" for the purposes of this disclosure is any information that is transmitted from a software within operating environment to an external environment or any information that is transmitted from the external environment to the software within operating environment. For example, and without limitation, transmission request may include data received from one or more external environments that has been transmitted to processor 108. This data may include but is not limited to, information received over a network, information received from sensors, and the like. In another nonlimiting example, software module and/or a software within operating environment 125 may process and/or generate data, wherein the processes and/or generated data may be transmitted to an external environment outside of operating environment 120. "External environment" for the purposes of this disclosure is an environment located outside of operating environment 120. For example, and without limitation, external environment may include the operating system in which operating environment 120 is operating on, a second operating environment 120 running on the same or differing operating system as operating environment 120, a database, a remote device communicatively connected to processor 108, a cloud server, a network, a communication network, a sensing device, and the like. In one or more embodiments, external environment may include a second operating environment 120. In one or more embodiments, two or more operating environments may be operating simultaneously on a single system and/or single host operating system. In one or more embodiments, operating environments may interact with one another wherein data may be transmitted to and/or from operating environments. In one or more embodiments, external environment may include second operating environment wherein operating environment 120 and second operating environment may communicate with each other. In one or more embodiments, transmission datum 132 may include any information that may pass between operating environment 120 and external environment. In one or more embodiments, processor 108 may include external environment. In one or more embodiments, operating environment 120 may be communicatively connected to processor 108 through a virtualization layer, digital binary unit system (BUS) controller and the like. This will be explained in further detail below.

With continued reference to FIG. 1, transmission datum 132 may include a partition policy. A "partition policy," for the purpose of this disclosure, is rules, constraints, and configurations for how a partition (or a virtual machine/container) within operating environment 120 accesses resources. In some cases, at least a partition policy may specify how much CPU, memory, storage, network bandwidth and/or the like a partition in question can utilize. In some cases, at least a partition policy may also determine the scheduling policy for a partition, for example, the partition's priority, operating time, or whether it's preemptible. In an embodiment, at least a partition policy may define a level of separation between plurality of partitions to ensure that one partition's operation doesn't adversely impact another's. In such embodiment, this may prevent failures from propagating. In some cases, partition policy may also outline what resources e.g., I/O devices, data files, network interfaces, and/or the like partition may be able to access. In some cases, partition policy may include a level of access (e.g., read, write, execute, and the like). In a non-limiting example, in an aviation system, at least a partition policy may be configured to ensure that a partition handling flight control logic gets a highest priority and is isolated from partitions handling non-critical tasks e.g., in-flight entertainment. In another non-limiting example, partition policies may balance computing resources allocation for achieving a desired system performance e.g., desired energy efficiency, ensuring that each VM get only the resources it needs.

With continued reference to FIG. 1, in one or more embodiments, transmission datum 132 may include sensor data. "Sensor data" for the purposes of this disclosure is any detectable phenomena that has been captured by one or more sensors. For example, and without limitation sensor data may include temperatures, speed, velocity, acceleration, humidity, orientation, voltage, watts, and/or the like. In one or more embodiments, one or more sensors may be communicatively connected to processor 108. In one or more embodiments, processor 108 may receive data generated by one or more sensors and generate sensor data and/or transmission datum 132. As used in this disclosure, a "sensor" is a device that is configured to detect an input and/or a phenomenon and transmit information related to the detection. For example, and without limitation, a sensor may transduce a detected charging phenomenon and/or characteristic, such as, and without limitation, temperature, voltage, current, pressure, and the like, into a sensed signal such as a voltage with respect to a reference. sensor may detect a plurality of data. A plurality of data detected by sensor may include, but is not limited to, battery quality, battery life cycle, remaining battery capacity, current, voltage, pressure, temperature, moisture level, and the like. In one or more embodiments, and without limitation, sensor may include a plurality of sensors. In one or more embodiments, and without limitation, sensor may include an optical or image sensor such as a camera, a CMOS detector, a CCD detector, a video camera, a photodiode, a photovoltaic cell, a photo-conductive device, a thermal and/or infrared camera, one or more temperature sensors, voltmeters, current sensors, hydrometers, infrared sensors, photoelectric sensors, ionization smoke sensors, motion sensors, pressure sensors, radiation sensors, level sensors, imaging devices, moisture sensors, gas and chemical sensors, flame sensors, electrical sensors, imaging sensors, force sensors, Hall sensors, and the like. Sensor may be a contact or a non-contact sensor. Signals may include electrical, electromagnetic, visual, audio, radio waves, or another undisclosed signal type alone or in combination.

With continued reference to FIG. 1, sensor may include a plurality of independent sensors, where any number of the described sensors may be used to detect any number of physical or electrical quantities. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of sensor to detect phenomenon may be maintained. In one or more embodiments, one or more sensors may be used to detect the same or similar phenomena. In one or more embodiments, redundant sensors may be used to ensure accuracy of results. In one or more embodiments, sensor data may include data received from redundant sensors wherein inconsistencies within sensor data may indicate a comprised data file and/or innervate sensors.

With continued reference to FIG. 1, sensor may be communicatively connected to processor 108 wherein sensor data may be received by a host operating system and/or a differing operating environment 120 initiated on host operating system. In one or more embodiments, sensor data may be received by host operating system, a differing operating environment 120, a database, a network connected to host operating system and the like.

With continued reference to FIG. 1, sensor data may contain a designated data protocol. "Data protocol" for the purposes of this disclosure is a specific set of rules that govern how data is exchanged between two or more devices. The rules may govern how data is packaged, transmitted and received. For example, and without limitation, data protocol may include Link-16, wherein Link-16 may include a high-speed digital data link in which data is transmitted over an ultra-high frequency band. In one or more embodiments, data protocols may include but are not limited to LINK-16, United States Military standard (MIL-STD), Defense Data network (DDN), Tactical Data Link (TDL), Byzantine fault-tolerant (BFT) protocols, STANAG 4586, Real Application Cluster (RAC), RAC2 and the like. In one or more embodiments, each data protocol may contain a specific set of rules that govern how data can be packaged, transmitted and/or received. In one or more embodiments, data associated with each data protocol may require particular file formats. For example and without limitation, a particular datum may be converted into a geographic information system (GIS) file format in instances in which the datum contains geographical information. "Designated data protocol" for the purposes of this disclosure is a particular data protocol in which a device is configured to follow. For example, and without limitation, sensor may contain Link-16 as its designated data protocol wherein data packaged, transmitted and/or received may adhere to Link-16 protocols. In one or more sensor may contain various hardware and/or software that may be configured to convert raw data received from sensor into sensor data. In one more embodiments, sensor data may include data received from sensor that has been converted into a protocol compliant format. "Protocol compliant format" for the purposes of this disclosure is datum that adheres to the rules of a particular data protocol. For example, and without limitation, sensor data may be in a protocol compliant format such that sensor data may adhered to a Link-16 data protocol. In one or more embodiments, sensor data hacking a designated data protocol may include sensor data having a protocol compliant format associated with designated data protocol. In one or more embodiments, raw data from sensor may be converted into protocol compliant format such that elements of sensor data may include time stamps, identifiers, and particular file formats. In one or more embodiments, a protocol compliant format may include data that has been segmented into packets to aid in transmission. Ine or more embodiments, protocol compliant format may include associated metadata wherein the associated metadata may include geographical locations, geospatial coordinates, time stamps, calibration information, sensor information and the like. In one or more embodiments, sensor data may include a digital signature, such as any digital signature as described in this disclosure. In one or more embodiments, the digital signature may be used to ensure that sensor data was retrieved from a non-compromised location and/or device. In one or more embodiments, protocol compliant format may include information indicating the classification level of a particular data (e.g. classified, unclassified, top secret, etc.). In one or more embodiments, a protocol compliant format may include a unique identifier associated with the origin of the sensor data. For example, and without limitation, a sensor and/or any other device may contain a unique identifier, wherein the unique identifier may be sued to determine the sensor and/or device in which the data has originated from. In one or more embodiments, sensor data may contain a designated data protocol wherein sensor data contains a protocol complaint format associated with the data protocol.

With continued reference to FIG. 1, transmission datum 132 and/or sensor data may include a designated data protocol wherein the information within transmission datum 132 may contain protocol compliant format associated with one or more data protocols as described above. In one or more embodiments, each data protocol may contain a particular set of rules in which data may be packaged and/or transferred. In one or more embodiments, protocol compliant format may include data that has been encrypted. In one or more embodiments, data may be encrypted prior to transmission over a network or between two devices. In one or more embodiments, each data protocol may adhere to a particular encryption process. In one or more embodiments, protocol compliant format may include a datum that has been encrypted. In one or more embodiments, transmission datum 132 may be encrypted prior to transmission to other devices and/or to operating environment 120. In one or more embodiments, encryption processes may include an Advanced Encryption standard (AES), AES-128, AES-192, AES-256, Secure Sockets Layer (SSL), Rivest-Shamir-Adleman (RSA) encryption, and the like. In one or more data may be encrypted during transmission to and/or from operating environment 120. In one or more embodiments, a device and/or system transmitting transmission datum 132 may utilize a public key to encrypt transmission datum 132, wherein a device and/or system receiving transmission datum 132 may utilize a private key to decrypt the transmission datum 132.

With continued reference to FIG. 1, transmission datum 132 may further include position, navigation and timing (PNT) data. "Position, navigation and timing data" for the purposes of this disclosure is three distinct sets of information related to the position of an object, navigation from one point to another, and information associated with time. In one or more embodiments, PNT data may include three distinct sets of information associated with precision, navigation, and timing. In one or more embodiments, PNT data may include position data. "Position data" for the purposes of this disclosure is information associated with a person's location and an associated two dimensional/three-dimensional orientation (position). In one or more embodiments, position data may be used to determine the location of an object and/or the orientation of the object. In one or more embodiments, position data may contain information in the form of geospatial units. In one or more embodiments, position data may be referenced to a standard geodic system such as WGS 60, WGS72 and/or WGS 84. In one or more embodiments, PNT data may include navigation data. In one or more embodiments, position data may include accuracy of the data to a particular extent such as but not limited to, accuracy within one foot, one mile, one inch and the like. In one or more embodiments, position data may include the accuracy and/or precision of detectable phenomena within PNT data. "Navigation data" for the purposes of this disclosure information associated with a current location, desired position, courses, orientations, or speed (navigation) of an object. In one or more embodiments, navigation data may include directions from a current or desired portion to an end location. In one or more embodiments, navigation data may include an orientation for the directions, such as but not limited to, north, south, east west, and/or combinations thereof. In one or more embodiments, navigation data may include speeds, such as velocity, airspeed, ground speed and the like. In one or more embodiments, navigation data may include a current or desired position and an end position in geospatial units. In one or more embodiments, PNT data may include Time data. "Time data" for the purposes of this disclosure is information associated with the time. In one or more embodiments, time data may include, the current time, the estimated time to reach a location, calculated amount of time that has passed between two events and the like. In one or more embodiments, PNT data may be used for global positioning systems (GPS) wherein GPS may determine the location of an individual, an end location and the amount of time it may take. In one or more embodiments, PNT data may be used for GPS navigation wherein a GPS system may use an individual's current location, end location and position to determine various routes, upcoming turns, and the like. In one or more embodiments, PNT data may be used for aviation navigation wherein an aircraft may be located at a particular point in space and time. In one or more embodiments, PNT data may be utilized for military operations, such as determining locations of targets, determining locations of individuals and the like. In one or more embodiments, PNT data may be used for navigation of various aeronautical devices such as but not limited to, missiles, planes, helicopters, and the like. In one or more embodiments, PNT data may be used for cars trucks, boats, and/or any other moving objects. In one or more embodiments, PNT data may be used for networks such as cellular networks wherein data may be stamped with an origin location and time.

With continued reference to FIG. 1, in one or more embodiments, transmission datum 132 may include PNT data, wherein PNT data may be retrieved from a variety of sources. In one or more embodiments, transmission datum 132 may include a plurality of PNT data wherein the plurality of PNT data may include redundant data. In one or more embodiments, redundant data may allow for ensured accuracy in data wherein multiple data points may be collected from multiple sources. For example, and without limitation, position data may be retrieved from multiple sources, such as but not limited to, networks, GPS, sensors and the like to determine position. In one or more embodiments, retrieval from multiple sources may ensure that data is consistent from multiple sources. In one or more embodiments, redundancy may allow for error detection wherein, a set of redundant data elements that are not consistent may indicate an issue. In one or more embodiments, transmission datum 132 may include a plurality of PNT data wherein each PNT data is retrieved from a different source, network and the like. In one or more embodiments, retrieval from multiple sources may allow for data to be generated even when a particular source may not be accessed. For example, and without limitation, in area in which GPS access is denied, PNT data may still be retrieved. In one or more embodiments, a plurality of PNT data may allow for data to be retrieved even in instances in which one or more sources are not available. In one or more embodiments, multiple sources for PNT data may allow for assured position navigation and timing (APNT). "Assured position navigation and timing" for the purposes of this disclosure is a multi-domain system in which PNT data may be received from multiple domains or sources to ensure that data is always received. For example, and without limitation, APNT may use multiple sources of navigation and timing including network, Global Positioning System (GPS), Chip-Scale Atomic Clock (CSAC), terrain referenced navigation, start trackers, and others to form the best, APNT solution based on the aggregated results of all sources. This enables platforms to operate without direct dependence on any single source of PNT data, so operations continue where a source is unavailable, such as GPS-denied areas. In one or more embodiments, APNT allows for a reliable counterpart to GPS in instances in which GPS is unavailable. In one or more embodiments, APNT may utilize sonar, Lidar, magnetic frequency, gravity, sensors and the like to determine PNT data. In one or more embodiments, PNT data may be received from multiple external environments, wherein the multiple external environments may include multiple networks, database, sensors, software containers 120, processor 108 and the like. In one or more embodiments, PNT data may be received from multiple external environments wherein processor 108 may be configured to aggregate data from multiple environments to create PNT data. In one or more embodiments, processor 108 may be configured to retrieve data in simultaneous order wherein when a first external environments is unavailable, processor 108 may proceed to the second external environment. In one or more embodiments, processor 108 may be configured to receive a datum from multiple external environments and aggregate the multiple datum to create transmission datum 132. In one or more embodiments, transmission datum 132 may include data retrieved from multiple external environments and/or disparate networks. In one or more embodiments, PNT data may be retrieved from multiple external environments.

With continued reference to FIG. 1, transmission datum 132 may include a communication. "Communication" for the purposes of this disclosure is transmitted information from one individual to another. In one or more embodiments, communications may be generated by computing devices 104, systems and such and transmitted to other computing devices 104, systems, and such. For example and without limitation, communication may include textual information that one individual may convey to another, audio recordings, video recordings and the like. In one or more embodiments, communication may include live communications similar to communications received through a telephone call, over a radio, through a smart device and the like. In one or more embodiments, communications may be in a text format, binary format, ASCII text and the like. In one or more embodiments, communication may be received in a variable message format (VMF). In one or more embodiments, communication may be received in a 16-line message format, basic message format and the like. In one or more embodiments, communications may contain various formatting structures such as but not limited to a heading, a text portion, and an ending. In one or more embodiments in a 16-line message format, a message may contain a maximum of 16 lines. In one or more embodiments, communication may be received from one or more external environments. In one or more embodiments, one or more external environments may include one or more communication networks. In one or more embodiments, communication networks may include but are not limited to radio communication networks, satellite networks, tactical data links, internet-based communications, Defense data networks (DDN), military satellite communication networks, data link networks and the like.

With continued reference to FIG. 1, transmission datum 132 may be received from one or more external environments. In one or more embodiments, elements of transmission datum 132 may be received from differing external environments. In one or more embodiments, system 100 may be configured to receive transmission datum 132 continuously wherein each transmission datum 132 may be received from one or more external environments. In one or more embodiments, system 100 may be configured to receive transmission data from any external environment and in any file format. In one or more embodiments, external environments may differ in each iteration, wherein a first external environment may be the source of a first transmission datum 132 whereas a second external environment may be the source of a second transmission datum 132.

With continued reference to FIG. 1, processor 108 is configured to modify transmission datum 132. In one or more embodiments, a process of modifying transmission datum 132 may include encryption transmission datum 132. In one or more embodiments, processor 108 may be configured to encrypt transmission datum 132 using one or more cryptographic processes as described above. In one or more embodiments, processor 108 may utilize a cryptographic system as described above to convert plaintext within upload data to ciphertext. In one or more embodiments, processor 108 may encrypt transmission datum 132 wherein a software and/or operating environment 120 configured to receive transmission datum 132 may contain the decryption key. In an embodiment, encryption may ensure that data is not tampered and/or viewed during transmission and that the proper operating environment 120 and/or external environment receives transmission datum 132. In one or more embodiments, encrypting transmits datum may include the production of cryptographic hashes. In one or more embodiments, processor 108 may generate one or more cryptographic keys using one or more key generation processes as described in this disclosure.

With continued reference to FIG. 1, processor 108 may be configured to modify transmission datum 132 as a function of DAL classification 128. In one or more embodiments, each DAL classification 128 may contain a corresponding encryption key and/or encryption process wherein corresponding external environments associated with the same DAL classification 128 may contain the corresponding decryption key. For example, and without limitation, an operating environment 120 associated with a DAL-A classification may contain an encryption key associated with the DAL-A classification. Continuing, corresponding recipients 136 (as described in further detail below) associated with the DAL-A classification may contain the proper decryption key in order to decrypt transmission datum 132. In one or more embodiments, recipients 136 of transmission datum 132 may contain more than one description keys based on their DAL classification 128. For example, and without limitation, a recipient 136 associated with a DAL-D classification may contain decryption keys for software associated with DAL-D and DAL-E, while a recipient 136 associated with a DAL-A classification may contain decryption keys associated for software associated with DAL-A until DAL-E classifications. In one or more embodiments, recipients 136 of transmission datum 132 such as external environments may be configured to decrypt transmission datum 132 based on a hierarchy wherein higher ranked DAL classifications 128 may decrypt lower ranked DAL classifications 128 as well.

With continued reference to FIG. 1, processor 108 may modify transmission datum 132 by appending a digital signature to transmission datum 132. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

Still referring to FIG. 1, in one or more embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in one or more embodiments contains data conveying the certificate authority's authorization for the recipient 136 to perform a task. The authorization may be the authorization to access a given datum. The authorization may be the authorization to access a given process. In one or more embodiments, the certificate may identify the certificate authority. The digital certificate may include a digital signature.

With continued reference to FIG. 1, in one or more embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature. In one or more embodiments, digital signature may be generated as a function of DAL classification 128 wherein each DAL classification 128 may correspond to a particular digital signature. In one or more embodiments, digital signatures may be used to determine the DAL classification 128 of the source of the transmission of transmission datum 132. In one or more embodiments, external environment and/or a recipient 136 of transmission datum 132 may determine the authenticity of transmission datum 132 through digital signature.

With continued reference to FIG. 1, processor 108 may be configured to modify transmission datum 132 by dividing and/or segmenting transmission datum 132. In one or more embodiments, transmission datum 132 may be segmented into packets 140. A "packet" for the purposes of this disclosure is a portion of transmission datum 132 that is to be transmitted. For example, and without limitation, transmission datum 132 may be segmented into a plurality of packets 140 wherein the plurality of packets 140 may be transmitted to external environment. In one or more embodiments, each packet 140 may include information indicating the sequence number of the packet 140. In one or more embodiments, the sequence number may be used to indicate what portion of transmission datum 132 a particular packet 140 contains. In one or more embodiments, packets 140 may contain information indicating which portion of transmission datum 132 is contained within packet 140. In one or more embodiments, packets 140 may contain an address in which transmission datum 132 will be transmitted to. In one or more embodiments, an address on packet 140 may include a location of a recipient 136 who will receive packet 140. A "recipient" for the purposes of this disclosure, is an individual, software or hardware that is to receive transmission datum 132. For example, and without limitation, recipient 136 may include external environment as described above. In one or more embodiments, recipient 136 may include a processor 108 wherein transmission datum 132 include information that requires processing by processor

108. In one or more embodiments, recipient 136 may include a remote device or a host operating system, a second operating environment 120 and the like. In one or more embodiments, second operating environment 120 may be located on a host operating system, in a remote location and/or the like. In one or more embodiments, each packet 140 may contain an address of recipient 136 wherein packet 140 may be transmitted to recipient 136. In one or more embodiments, operating environment 120 may designate recipient 136 and an address for recipient 136 wherein processor 108 may be configured to segment transmission datum 132 into packets 140 and determine recipient 136 and address of recipient 136.

With continued reference to FIG. 1, in one or more embodiments, processor 108 may utilize a conversion layer to modify transmission datum 132. A "conversion layer" for the purposes of this disclosure is a system that is configured to convert data from one format or protocol to another. For example, without limitation, conversion layer may receive datum as an analog signal and convert the datum to a digital signal. In another non limiting example, conversion layer may convert a datum having a text-based communication protocol into a datum having a binary based communication protocol. In one or more embodiments, conversion layer may be configured to convert data formats, such as converting code from one formatting language to another. For example, and without limitation, from a binary code format to a python related format. In one or more embodiments, conversion layer may be configured to convert a datum between various data protocols, between communication protocols, between network protocols and the like. In one or more embodiments, conversion layer may utilize character encoding in order to convert characters from one readable format to another. In one or more embodiments, conversion layer may encrypt and/or decrypt data. In one or more embodiments, conversion layer may be configured to validate data, authenticate data, and the like. In one or more embodiments, conversion layer may be configured to receive datum containing a plurality of differing formats and convert the datum into a single unified format. For example, and without limitation, conversion layer may receive data from a plurality of sensors wherein each sensor may contain a differing format and convert the data to a single unified format. In one or more embodiments, conversion layer may be configured for data transformation wherein data may be converted, cleaned and structured into a particular format.

With continued reference to FIG. 1, in one or more embodiments, conversion layer may be included within operating environment 120. In one or more embodiments, conversion layer may include libraries, binary encodings and the like that allow operating environment 120 to interact with external environment and/or recipient 136. In one or more embodiments, executable software that is compiled must rely on additional proprietary libraries and binary encodings needed by the operating system to load applications into application environments and connect applications to the standard data services called by the utilization of standard APIs. Because of this limitation all software developed must be built and integrated using the same exact OS tools of the same version. In one or more embodiments, conversion layer may contain the necessary libraries, encodings and the like to allow for operating environment 120 to interact with external environment and/or recipient 136. In one or more embodiments, conversion layer may be configured to modify transmission datum 132 wherein transmission datum 132 may be configured to communicate with external environment.

With continued reference to FIG. 1, conversion layer may determine the authenticity, security credibility and/or reliability of data received. In one or more embodiments, data received by and/or transmitted from operating environment 120 may pass through conversion layer before communicating with external environment. In one or more embodiments, conversion layer may ensure that data passing to and/or from external environment is secure. In one or more embodiments, conversion layer may compress and/or decompress data prior to transmission. In one or more embodiments, transmission datum 132 may be initially transmitted by software container 124 and/or operating environment 120 and received by conversion layer wherein conversion layer may modify transmission datum 132 and transmit modified transmission datum 132 to external environment. Similarly, conversion layer may receive transmission datum 132 from external environment, modify transmission datum 132 and transmit modified transmission datum 132 to software container 124 and/or operating environment 120. In one or more embodiments, conversion layer may serve as an intermediary between operating environment 120 and external environment wherein data passing through conversion layer may be modified for the respectable recipient 136.

With continued reference to FIG. 1, system 100 may include an intelligent bus controller 144. A "digital bus" for the purposes of this disclosure is a communication pathway that connects various components within a digital system. In one or more embodiments, digital bus may form communication between digital systems and hardware components. In one or more embodiments, digital bus may include a virtualized bus wherein a connection between a system and hardware may be virtualized. In one or more embodiments, the digital bus may allow for communication between virtual machines and host circuit. In one or more embodiments, digital bus may allow for communication between operating environment 120 and processor 108, memory and/or other hardware components of computing device 104. In one or more embodiments, the digital bus may serve as a medium for transferring information between different parts of a system including the CPU, memory, GPU and the like. In one or more embodiment, digital bus may be used to transmit packets 140 and/or transmission datum 132 to and/or from operating environment 120. In one or more embodiments, virtualized environments such as operating environment 120 may be isolated from host circuit wherein digital bus may provide for communication between operating environment 120 and host circuit. An "intelligent bus controller" for the purposes of this disclosure is a control system for a digital bus that is capable of dynamically optimizing data transfer between operating environment 120 and external environment. For example, and without limitation, data transfer between operating environment 120 and external environment may be limited wherein intelligent bus controller 144 may be configured to prioritize various packets 140 based on a particular need. In one or more embodiments, some packets 140 may contain more important tasks and/or information in comparison to others wherein intelligent bus controller 144 may be configured to prioritize various packets 140. In one or more embodiments, intelligent bus controller 144 may be configured to optimize data transfer based on priority and/or bandwidth requirements of differing components within system 100. In one or more embodiments, processor 108 may be configured to transmit a plurality of transmission datum 132 from operating environment 120, wherein intelligent bus controller 144 may be configured to prioritize transmission datum 132 within plurality of transmission datum 132 based on need, importance and the like.

With continued reference to FIG. 1, intelligent bus controller 144 may be configured to convert data from one format to another. In one or more embodiments, intelligent bus controller 144 may include conversion layer wherein transmission datum 132 and/or packets 140 may be converted and/or modified prior to and/or during transmission. In one or more embodiments, intelligent bus controller 144 may be configured to convert transmission data in a standardized format and/or a format suitable for host operating system. In one or more embodiments, intelligent bus controller 144 may be configured to convert transmission datum 132 into a particular file format, encrypt transmission datum 132, decrypt transmission datum 132, and the like. In one or more embodiments, intelligent bus controller 144 may be configured to determine the authenticity of transmission datum 132 by identifying digital signature within transmission datum 132.

With continued reference to FIG. 1, intelligent bus controller 144 may be configured to queue packets 140 wherein packets 140 may be transmitted through intelligent bus controller 144 in sequence. In one or more embodiments, information contained within packets 140 may indicate the sequence of packets 140 wherein the sequence may indicate a relative order for packets 140. In one or more embodiments, packets 140 may be temporarily stored in queues in instances in which large sets of data may be transmitted. In one or more embodiments, transmission datum 132 may be transmitted through intelligent bus controller 144 as a function of a modification of transmission datum 132 wherein encrypted transmission datum 132, packets 140 and the like may be transmitted through intelligent bus controller 144.

With continued reference to FIG. 1, intelligent bus controller 144 may be configured to compare transmission datum 132 and/or modify transmission datum 132 as a function of user input parameters 148. "User input parameters" for the purposes of this disclosure are a set of rules or protocols that a transmission datum 132 must adhere to prior to or during transmission. For example, and without limitation, user input parameters 148 may indicate that transmission datum 132 must be encrypted prior to transmission. In one or more embodiments, user input parameters 148 may indicate a particular communication protocol, a particular file format a particular, network in which transmission datum 132 may be transmitted, determination of priority of transmission datum 132 and the like. In one or more embodiments, user input parameters 148 may govern how intelligent bus controller 144 receives transmission datum 132, modifies transmission datum 132, and transmits transmission datum 132. In one or more embodiments, user input parameters 148 may dictate the size of packets 140, the type of encryption, the bandwidth allocation, whether allocated bandwidth is dynamic or static, the priority of various transmission datum 132 and/or packets 140, clock speed of intelligent bus controller 144, data transfer rate, addressing and the like. In one or more embodiments, intelligent bus controller 144 may be governed by rules or parameters indicated by a user. A "user" for the purposes of this disclosure is an individual who interacts with system 100. For example, and without limitation, user may include an operator of operating environment 120, a military personnel, an individual interested in transmission datum 132 and the like.

With continued reference to FIG. 1, user input parameters 148 may be received through a user input into computing device 104. In one or more embodiments, user input may be received from a remote device, such as but not limited to, a smartphone, a laptop, a desktop computer, from an input device communicatively connected to computing device 104 and the like.

With continued reference to FIG. 1, intelligent bus controller 144 may contain a user interface such as graphical user interface. For the purposes of this disclosure, a "user interface" is a means by which a user and a computer system interact. For example, through the use of input devices and software. In some cases, processor 108 may be configured to modify graphical user interface based on inputs received by a user and/or based on current user input parameters 148 within intelligent bus controller 144, and visually present data through GUI 152. A user interface may include graphical user interface, command line interface (CLI), menu-driven user interface, touch user interface, voice user interface (VUI), form-based user interface, any combination thereof and the like. In one or more embodiments, a user may interact with the user interface using a computing device 104 distinct from and communicatively connected to processor 108. For example, a smart phone, smart tablet, or laptop operated by the user and/or participant. A user interface may include one or more graphical locator and/or cursor facilities allowing a user to interact with graphical models and/or combinations thereof, for instance using a touchscreen, touchpad, mouse, keyboard, and/or other manual data entry device. A "graphical user interface," as used herein, is a user interface that allows users to interact with electronic devices through visual representations. In one or more embodiments, GUI 152 may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in graphical user interface. Persons skilled in the art, upon reviewing the entirety of this disclosure, will be aware of various ways in which a graphical user interface and/or elements thereof may be implemented and/or used as described in this disclosure.

With continued reference to FIG. 1, GUI 152 may contain one or more interactive elements. An "interactive element" for the purposes of this disclosure is an element within a graphical user interface that allows for communication with apparatus by a user. For example, and without limitation, interactive elements may include push buttons wherein selection of a push button, such as for example, by using a mouse, may indicate to system to perform a particular function and display the result through graphical user interface. In one or more embodiments, interactive element may include push buttons on GUI 152, wherein the selection of a particular push button may result in a particular function. In one or more embodiments, interactive elements may include words, phrases, illustrations and the like to indicate the particular process the user would like system to perform. In one or more embodiments, interaction with interactive elements may result in the input of user input parameters 148. In one or more embodiments, various user input parameters 148 may be displayed on GUI 152, wherein a user may select from a list of already existing user input parameters 148. In one or more embodiments, each interactive element may contain corresponding code and/or instructions configuring intelligent bus controller 144 to perform one or more actions. For example and without limitation, an interactive element associated with encryption may contain corresponding code and/or instructions to encrypt transmission datum 132 and/or packets 140. In one or more embodiments, intelligent bus controller 144 may receive user input parameters 148 and modify transmission datum 132 as a function of user input parameters 148. In one or more embodiments, GUI 152 may contain a list of interactive elements associated with DAL classifications 128 wherein each interactive element may contain a predetermined set of instructions for each DAL classification 128. For example, and without limitation, an interactive element associated with a DAL-A classification may contain instructions for modifying transmission datum 132 associated with DAL-A classification. This may include modifications such as bandwidth allocation, encryption, the addition of digital signature and the like.

With continued reference to FIG. 1, intelligent bus controller 144 may determine recipients 136 of transmission datum 132. In one or more embodiments, transmission datum 132 and/or packets 140 may contain information associated with recipients 136 such as, for example, an address, a unique identifier and the like. In one or more embodiments, operating environment 120 may indicate and/or identify recipients 136 of transmission datum 132. In one or more embodiments, intelligent bus controller 144 may be configured to identify recipients 136 and determine if recipients 136 are suitable for transmission of transmission datum 132. In one or more embodiments, user input parameters 148 may indicate recipients 136 that have bene approved for transmission datum 132. In one or more embodiments, intelligent bus controller 144 may receive a control access list 156 and compare recipients 136 indicated within transmission datum 132 to control access list 156. A "Control access list" for the purposes of this disclosure is a list of recipients 136 that are authorized to receive transmission datum 132. For example, and without limitation, control access list 156 may include recipients 136 such as processor 108, host operating system, a particular external environment, a particular network, a second operating environment 120 and the like. In one or more embodiments, control access list 156 may indicate which recipients 136 may receive transmission datum 132. In one or more embodiments, user input parameters 148 may include control access list 156 wherein a user may indicate recipients 136 that are authorized to receive transmission datum 132. In one or more embodiments, transmission datum 132 may require authorization prior to transmission. In one or more embodiments, recipients 136 may be compared to control access list 156 in order to determine an authorization for transmission of transmission datum 132. In one or more embodiments, determining an authorization may include determining if the recipient 136 identified in the control access list. In one or more embodiments, unauthorized recipients 136 may make a request for information from operating environment 120 wherein intelligent bus controller 144 may deny a request for information based on authorization indicated within control access list 156. In one or more embodiments, control access list 156 may indicate recipients 136 having a particular digital signature wherein all recipients 136 having said particular digital signature may be given authorization to send and/or receive information from operating environment 120. In one or more embodiments, intelligent bus controller 144 may be configured to compare recipients 136 of transmission datum 132 to control aces list. In one or more embodiments, intelligent bus controller 144 may be configured to transmit transmission datum 132 as a function of the comparison between intelligent bus controller 144 and transmission datum 132.

With continued reference to FIG. 1, intelligent bus controller 144 may be configured to replicate and/or duplicate transmission datum 132. In one or more embodiments, user input parameters 148 may include a replication and/or duplication of transmission datum 132 and/or packets 140. In one or more embodiments, intelligent bus controller 144 may duplicate transmission datum 132 wherein two similar sets of transmission datum 132 may be transmitted through intelligent bus controller 144. In one or more embodiments, duplication of transmission datum 132 may allow for redundancy. In one or more embodiments, duplication of transmission datum 132 may ensure that transmission datum 132 is not corrupt. In one or more embodiments, intelligent bus controller 144 to compare transmission datum 132 to a duplicated transmission datum 132 following transmission through intelligent bus controller 144 in order to determine if data was lost or corrupt during transmission. In one or more embodiments, intelligent bus controller 144 may include a dual bus configuration 160. A "dual bus configuration" for the purposes of this disclosure refers to a setup in which two separate data paths are used to transfer data within a system. For example, and without limitation, intelligent bus controller 144 may be configured to transmit transmission datum 132 through a first digital bus and transmit a duplicate of transmission datum 132 through a second digital bus. In one or more embodiments, dual bus configuration may include similar digital buses acting in parallel with one another to carry out tasks simultaneously. In one or more embodiments, the use of more than one digital bus may allow for transmission of data in the event of failure of the other digital bus. In one or more embodiments, digital busses within dual bus configuration may be similar to ensure compatibility and consistency. In one or more embodiments, digital buses within a dual bus configuration may contain similar protocols, similar bandwidth, similar clock speed and the like. In one or more embodiments, digital buses within dual bus configuration may contain different parameters to handle differing loads wherein one digital bus may be configured to handle large amounts of data whereas another may be configured to handle smaller amounts of data. In one or more embodiments, a dial bus configuration may include digital buses that are configured for a specific purpose. For example, and without limitation, a data bus may be configured to transfer data between the processor 108 and memory 112 whereas an address bus may be used to specific memory address for read and write operations. In one or more embodiments, dual bus configuration may include two buses with differing hardware configurations. For example, and without limitation, two busses can be designed with differing hardware components such as different types of processors, different memory modules, differing communication interfaces and the like. In one or more embodiments, buses may have differing hardware configurations because they are sourced from differing entities or businesses. In one or more embodiments, using buses sourced from differing businesses may ensure that a fault occurring on one bus may not necessarily occur on another bus. In one or more embodiments, buses may have differing hardware configuration for differing purposes. For example, and without limitation a first bus may be utilized for high speed data transfer between the processor and the memory while a second bus may be designed for communication to a network. In one or more embodiments, dual bus configuration 160 may allow for transmission of duplicated data wherein if one digital bus fails, a second digital bus may still contain transmission datum 132. In one or more embodiments, intelligent bus controller 144 may be configured to transmit transmission datum 132 through each digital bus simultaneously wherein transmission datum 132 may be transmitted through a first digital bus and a duplicate of transmission datum 132 may be transferred though a second digital bus. In one or more embodiments, dual bus configuration 160 may allow for redundancy wherein, if one digital bus fails then a second digital bus may be utilized. In one or more embodiments, dual bus configuration 160 may allow for error correction wherein transmission datum 132 and a duplicate may be compared following transmission to ensure that data had not been lost or altered during transmission. In one or more embodiments, dual bus configuration 160 may allow for switching between digital buses wherein intelligent bus controller 144 may switch from a first digital bus to a second digital bus if intelligent bus controller 144 detects an issue with one digital bus. In one or more embodiments, dual bus configuration 160 may be utilized for load balancing wherein data such as transmission datum 132 may be distributed between more than one digital buses in order to prevent overloading.

With continued reference to FIG. 1, intelligent bus controller 144 may be configured to process transmission datum 132 and/or modify transmission datum 132 at a particular rate. In one or more embodiments, intelligent bus controller 144 may be limited in resources wherein information may be placed in queues and transmitted sequentially. In one or more embodiments, transmission datum 132 may be segmented into packets 140 wherein packets 140 may be placed in queues and transmitted through intelligent bus controller 144. In one or more embodiments, recipients 136 may be limited in bandwidth and/or resources wherein data, such as transmission datum 132, may be segmented and transferred in increments. For example, and without limitation, recipient 136 such as a second operating environment 120 may contain a maximum data transfer rate wherein intelligent bus controller 144 may limit the data transfer rate in order to match the data transfer rate of second operating environment 120. In one or more embodiments, an increased data transfer rate may result in data loss. In one or more embodiments, intelligent bus controller 144 may store packets 140 and/or transmission datum 132 in buffers. A "buffer" for the purposes of this disclosure is a storage area configured to hold data temporarily during transmission. For example and without limitation transmission datum 132 may be temporarily stored in buffers while awaiting transmission through intelligent bus controller 144. In one or more embodiments, packets 140 may be transmitted through intelligent bus controller 144 wherein packets 140 awaiting transmission may be placed in buffers. In one or more embodiments, buffers may be implemented as queues in order to manage the flow of data through intelligent bus controller 144. In one or more embodiments, intelligent bus controller 144 may be configured to transmit packets 140 based on a queue of the packet 140. In one or more embodiments, buffers may be used to match the data transfer speed of one environment (e.g., operating environment 120) with another environment (e.g. external environment and/or recipient 136). In one or more embodiments, intelligent bus controller 144 may determine a data transfer rate of recipient 136 and generate a queue as a function of the data transfer rate. In one or more embodiments, packets 140 may contain information indicating their status in queue wherein packets 140 may be transmitted sequentially based on the information contained therein. For example, and without limitation, a first packet 140 may be first in a queue, a second packet 140 may be second in the queue and the like.

With continued reference to FIG. 1, in one or more embodiments, multiple transmission datum 132 may be transmitted through intelligent bus controller 144. In one or more embodiments, each transmission datum 132 may be queued based on the order in which they were received. For example, and without limitation, a transmission datum 132 received first may be transmitted prior to a transmission datum 132 received second. In one or more embodiments, transmission datum 132 may be transmitted based on a priority of transmission datum 132. A priority of transmission datum 132 (herein after referred to as "priority data") for the purposes of this disclosure is information indicating a relative importance of a transmission datum 132 in comparison to other data. For example, and without limitation, one transmission datum 132 may be labeled as "high priority" wherein the high priority status may indicate that the transmission datum 132 is quite important. Similarly, a transmission datum 132 labeled and/or containing priority data 164 indicating "low priority" may indicate that the transmission datum 132 has a lower level of importance. In one or more embodiments, operating environment 120, may generate priority data 164 for each transmission datum 132. In one or more embodiments, the software within operating environment 120 may contain priority status wherein data generated from each software may contain an associated priority data 164. For example, and without limitation, data generated from a first software may always be labeled as "high priority" whereas data generated from a second software may contain a "medium priority". In one or more embodiments, transmission datum 132 may include priority data 164 and/or be associated with a particular priority data 164. In one or more embodiments, software within operating environment 120 may contain corresponding DAL classification 128 wherein priority data 164 may be generated based on the DAL classification 128. For example, and without limitation, a DAL-A classification may indicate that the transmission datum 132 has high priority while a lower DAL classification 128 may have lower priority.

In one or more embodiments, intelligent bus controller 144 may follow a 'first-in-first-out' principle wherein data is prioritized based on the order in which it was received. In one or more embodiments, data may be prioritized based on priority data 164. For example, and without limitation a second transmission datum 132 received after a first transmission datum 132 may never-the-less be placed in the front of a queue due to its priority. In one or more embodiments, intelligent bus controller 144 may receive a plurality of transmission datum 132 associated with a plurality of priority data 164 wherein intelligent bus controller 144 may generate a queue as a function of the priority data 164 and the transmission datum 132. In one or more embodiments, intelligent bus controller 144 may modify the queue based on newly receive transmission datum 132 and correlated priority data 164. In one or more embodiments transmission datum 132 may be transmitted based on its placement within a queue wherein priority data 164 may be used to determine the placement of transmission datum 132 within the queue. In one or more embodiments, priority data 164 may be used to indicate a level of importance of transmission datum 132 wherein information with higher importance may be prioritized for transmission and/or processing. In one or more embodiments, software with lower DAL classifications 128 can afford to have processing efficiency in comparison to software with higher DAL classifications 128. For example, and without limitation, a lower DAL classification 128 may include air conditioning on an aircraft while a higher DAL classification 128 may include flight controls. Continuing, it may be more important to increase the data transfer speed of flight controls in comparison to the air conditioning of an aircraft. In one or more embodiments, intelligent bus controller 144 may generate priority data 164 based on DAL classification 128 of transmission datum 132, a software within operating environment 120 and the like. In one or more embodiments, each software within operating environment 120 may contain an associated priority data 164 wherein transmission datum 132 generated from the software may be assigned the associated priority data 164. In one or more embodiments, priority data 164 may be generated as a function of a temporal element. A "temporal element" for the purposes of this disclosure is a variable associated with a duration of a transmission datum 132 in a queue. For example, and without limitation, temporal element may indicate 5 milliseconds wherein 5 milliseconds may denote the amount of time a transmission datum 132 has been placed in a queue. In one or more embodiments, transmission datum 132 may be placed in a queue for various periods of time until transmission wherein the period of time may be recorded as time variable. In one or more embodiments, priority data 164 may be generated as a function of temporal element wherein priority data 164 may increase or decrease based on the passage of time. In one or more embodiments, priority data 164 may be numerical ranging from 1-100 wherein 1 may indicate a low priority and 100 may indicate a high priority. In one or more embodiments, priority data 164 may include an initial numerical value, wherein the numerical value may increase over the passage of time. For example, and without limitation, priority data 164 of transmission datum 132 may start at 30 wherein following every 1 millisecond in the queue, priority data 164 may increase in numerical value by 1. As a result, after 10 milliseconds of waiting in a queue, priority data 164 may increase from 30 to 40. In one or more embodiments, temporal element may ensure that lower ranked transmission datum 132 are not continuously pushed to the end of a queue. In one or more embodiments, temporal element may allow for lower ranked transmission datum 132 to eventually be transmitted even if the level of importance is not too high. In one or more embodiments, priority data 164 may include a multiple and/or variable wherein priority data 164 may increase over the passage of time. In one or more embodiments, intelligent bus controller 144 may be configured to determine and/or generate priority data 164 in any way as described in this disclosure and continuously update priority data 164 based on temporal element.

With continued reference to FIG. 1, intelligent bus controller 144 may utilize a machine learning model to generate priority data 164. In one or more embodiments, priority data 164 may then be used to determine a placement of transmission datum 132 within a queue. In one or more embodiments, a machine learning model may be used to receive transmission datum 132 and generate priority data 164. In one or more embodiments, the machine learning model may be used to receive inputs and generate correlated outputs. In one or more embodiments, elements of transmission datum 132 may be correlated to outputs wherein the outputs may include numerical values used to calculate priority data 164. In one or more embodiments, processor 108 and/or intelligent bus controller 144 may use a machine learning module, such as any machine learning module herein, to implement one or more algorithms or generate one or more machine-learning models, and calculate data as described herein. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relation-ships between two or more categories of data elements. Exemplary inputs and outputs may come from a database, cloud network, server and the like described in this disclo-sure, or be provided by a user. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodi-ments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. Machine learning module may be used to generate a machine learning model and/or any other machine learning model using training data. Machine learn-ing model may be trained by correlated inputs and outputs of training data. Training data may be data sets that have already been converted from raw data whether manually, by machine, or any other method. Training data may be stored in database. Training data may also be retrieved from database. In one or more embodiments machine learning module may include a prioritization machine learning mod-ule wherein the prioritization machine learning module is configured to generate prioritization machine learning model. In one or more embodiments, prioritization machine learning model may be configured to receive inputs such as one or more transmission datum 132 and generate correlated outputs such as priority data 164. In one or more embodi-ments, priority data 164 may be used to queue transmission datum 132 and/or determine a placement of transmission datum 132 within the queue.

With continued reference to FIG. 1, in one or more embodiments, a machine-learning module such as a priori-tization machine learning module, may be generated using training data. Training data may include inputs and corre-sponding predetermined outputs so that machine-learning module may use the correlations between the provided exemplary inputs and outputs to develop an algorithm and/or relationship that then allows machine-learning module to determine its own outputs for inputs. Training data may contain correlations that a machine-learning process may use to model relationships between two or more categories of data elements. The exemplary inputs and outputs may come from database, such as any database described in this disclosure, or be provided by a user, technician, employee, military personnel and the like. In other embodiments, machine-learning module may obtain a training set by querying a communicatively connected database that includes past inputs and outputs. Training data may include inputs from various types of databases, resources, and/or user inputs and outputs correlated to each of those inputs so that a machine-learning module may determine an output. Correlations may indicate causative and/or predictive links between data, which may be modeled as relationships, such as mathematical relationships, by machine-learning pro-cesses, as described in further detail below. In one or more embodiments, training data may be formatted and/or orga-nized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to categories by tags, tokens, or other data elements.

With continued reference to FIG. 1, in one or more embodiments, a machine learning model such as prioritiza-tion machine learning model 168 may receive inputs such as transmission datum 132 and generate priority data 164 as outputs. In one or more embodiments, prioritization machine learning model 168 may be trained using prioritization training data 172. In one or more embodiments, prioritiza-tion training data 172 may include a plurality of transmis-sion datum 132 and/or elements thereof correlated to a plurality of priority data 164 and/or elements thereof. In one or more embodiments, prioritization training data 172 may include inputs corelated to numerical values wherein the numerical values may be used to determine priority data 164. In one or more embodiments, each elements of trans-mission datum 132 may be correlated to a numerical value, wherein intelligent bus controller 144 may aggregate numerical values to determine priority data 164. In one or more embodiments, prioritization training data 172 may be generated by a user, 3rd party and the like. In one or more embodiments, prioritization training data 172 may be used to train prioritization machine learning model 168 wherein priority data 164 and/or a priority of transmission datum 132 may be generated as function of prioritization machine learning model 168. In one or more embodiments, prioriti-zation machine learning model 168 may be self-trained wherein prioritization machine learning model 168 may receive feedback based on the efficiency of intelligent bus controller 144, a transmission rate of intelligent bus con-troller 144 and the like. In one or more embodiments, temporal elements may be used to train prioritization machine learning model 168, wherein transmission datum 132 that have been placed in the queue for long durations may indicate that priority of said transmission datum 132 may have been too low. In one or more embodiments, operating environment 120 and/or components interacting with operating environment 120 may contain efficiency parameters that indicate the minimum data transfer rate required, the minimum response time required and the like wherein the transfer rate of transmission datum 132 may be used to train prioritization machine learning model 168 to ensure that intelligent bus controllers 144 adheres to various requirements set by other components. In one or more embodiments, various DAL classified components may contain minimum response and/or data transfer requirements wherein responses that take too long may be used to train prioritization machine learning model 168 to update values associated with DAL classifications 128 and/or transmission datum 132. In one or more embodiments, prioritization machine learning model 168 may be trained as a function of temporal element wherein transmission datum 132 that have been placed for too long in a queue may be used to train prioritization machine learning model 168 to increase a priority of said transmission datum 132 in future iterations. In one or more embodiments, prioritization machine learning model 168 may be used to receive transmission datum 132 and generate priority data 164. In one or more embodiments, prioritization machine learning model 168 may be iteratively trained wherein new or unique data sets input into machine learning model may be used to train prioritization machine learning model 168. In one or more embodiments, prioritization machine learning model 168 may be trained to increase latency between inputs and outputs. In one or more embodiments, transmission of transmission datum 132 may be time dependent wherein transmitted data must be communicated within small periods of time. In one or more embodiments, resource requirements of computing device 104 may be used to train prioritization machine learning model 168. In one or more embodiments, prioritization machine learning model 168 may be trained to iteratively increase data transfer rates based on previous iterations wherein a decrease in data transfer rate may indicate that one or more weights on the machine learning model require adjustment in order to increase data transfer rate. In one or more embodiments, following each iteration of the processing priority data 164, prioritization machine learning model 168 may be trained based on a comparison to between data transfer rates of a current iteration and a previous iteration wherein increases in data transfer rates may indicate that prioritization machine learning model 168 has generated more accurate outputs. In one or more embodiments, intelligent bus controller 144 and/or processor 108 may be configured to determine a priority of transmission datum 132 as a function of prioritization machine learning model 168.

Figure 2:
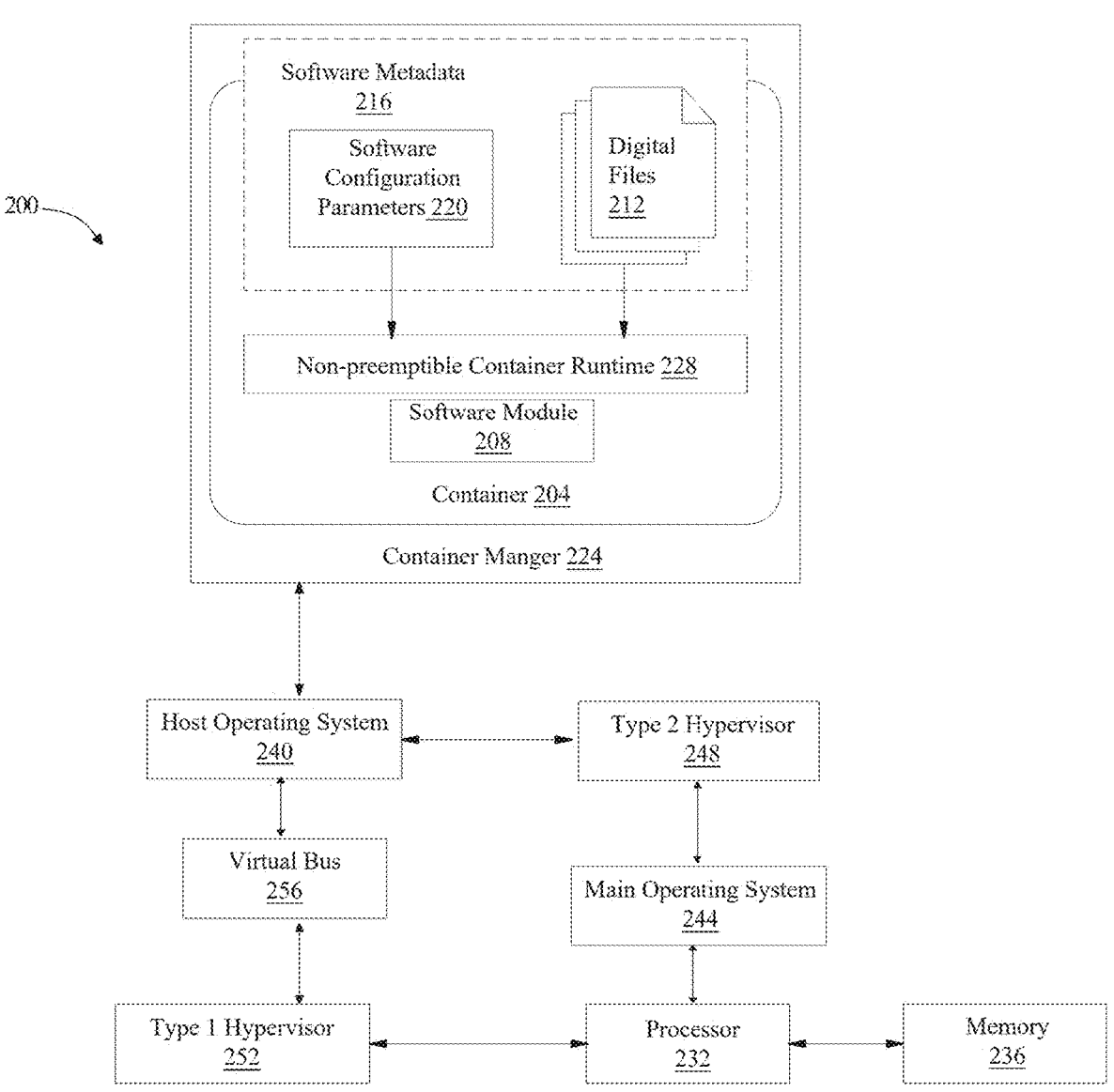
FIG. 2 is a block diagram of a system illustrating a software container in communication with one or more hardware components.

Referring now to FIG. 2, an exemplary embodiments of a system 200 illustrating a container 204 in communication with one or more hardware components is described. Container 204 may include a container such as software container as described in reference to FIG. 1. In an embodiment, a software module 208 may be designed to be reusable and to provide certain functionality that may be integrated into one or more different operating systems or larger software applications. In one or more embodiments, container 204 may allow for software module 208 to be reused on multiple operating systems. In one or more embodiments, container 204 may ensure that any dependencies, libraries and the like needed by software module may be retrieved from within container 204. In one or more embodiments, container may include code, runtime, system tools, system libraries, configurations, and/or the like. In some cases, at least container 204 may provide a "second layer" isolation or protection from a host operating system, environment and other containers and/or partitions. In one or more embodiments, container 2204 may include a standard unit of software that packages up code and all its dependencies such that software module 208 may run under a desired performance from one standard operating environment to another. In one or more embodiments, container contain digital files 212, wherein the digital files 212 contain dependencies, libraries, and/or any other information that may be used to ensure containment of software module 208. In one or more embodiments, instantiating software module 208 into container 204 may include extracting software metadata 216 from software module 208 wherein the software metadata 216 may include a plurality of software configuration parameters 220 and a plurality of digital files 212. As used in this disclosure, "software metadata" is information related to software module 208. In a non-limiting example, software metadata may include a manifest file specifying software version number, required dependencies, configurations and/or the like. As described herein, "software configuration parameters" are parameters that dictate how software module 208 should be set up within a particular standard operating environment (SOE). Exemplary software configuration parameters 220 may include, without limitation, one or more environment variables, service endpoints, port numbers, paths to necessary libraries or dependencies, and/or other configuration data necessary for software module 208 to operate in any virtual environment. In one or more embodiments, a container manager 224 may manage execution of container. In one or more embodiments, container manager 224 may be configured to manage container and ensure that software module 208 operates in an isolated environments. This may be done, for example, by setting up correct file paths, configuring virtual network settings, installing required libraries, and/or the like based on plurality of software configuration parameters 220. Integrating software module 208 may further include deploying plurality of digital files 212 within the initialized container 204. Container manager 224 may place plurality of digital files 212 in correct directories, setting permission, prepare container agent to execute plurality of digital files. In some cases, container agent may load at least one operational rule 122 into non-preemptible container runtime 228, such as a non-preemptible runtime as described above. In cases where container 204 is running at RTOS, certain level of service or response time may be guaranteed. In one or more embodiments, in instances in which container 204 contains a contain-runtime a container manager may not be needed. In a non-limiting example, at least one container 204 may be granted access to at least a processor 232, memory 236, and other resources as described above. Once software module 208 is running, it may have exclusive access to dedicated resources until it completes execution or a conclusion. Exemplary embodiments of at least one container 204 may include a DOCKER container (that encapsulate any payload and dependencies into a single object", RTOS container, safety-certified container (designed to meet stringent certification requirements of regulatory bodies such as, without limitation, FAA or EASA), among others.

With continued reference to FIG. 2, container 204 and/or container manager may communicate directly with a host operating system. In one or more embodiments, in instances in which contain 204 is managed by container manager 224, container manager may communicate with a host operating system 240 wherein the host operating system may transmit the communication to processor 232 and/or memory. In one or embodiments, in instances in which container 204 contains a container-runtime the container run time may communicate with the host operating system 240. In one or more embodiments, the host operating system 240 may include the operating system in which container 204 and/or container manager is running on. In one or more embodiments, host operating system 240 may include a virtual environment located on top of a primary operating system and/or a virtual environment in direct communication with hardware components. In one or more embodiments, host operating system 240 may run on top of on top of a main operating system 244, wherein the main operating system 244 may include the primary operating system of the computing device and the host operating system 240 may include the virtual environment generated by a virtual machine. In instances in which host operating system may be created on top of on top of main operating system 244, a type 2 hypervisor 248 may be used to create a virtualization layer on top of main operating system 244. In one or more embodiments, a host operating system 240 may communicate with type 2 hypervisor 248 wherein type 2 hypervisor 248 may communicate with main operating system 244 wherein main operating system may communicate with processor 232 and/or memory 236. In one or more embodiments, in instances in which host operating system does not run on top of main operating system 244, type 1 hypervisor 252 may be configured to create a virtualization layer on top of the hardware components such as processor and/or memory 236. In one or more embodiments, a virtual bus 256 may allow for communication between host operating system 240 and processor 232. In one or more embodiments, a type 1 hypervisor may allow for increased isolation wherein host operating system 240 may communicate directly with processor. In one or more embodiments, in a type 2 hypervisor, host operating system 240 must first communicate with virtualized components of type 2 hypervisor 248 wherein type 2 hypervisor may communicate with main operating system 244 and finally main operating system 244 may communicate with processor 232.

Figure 3:
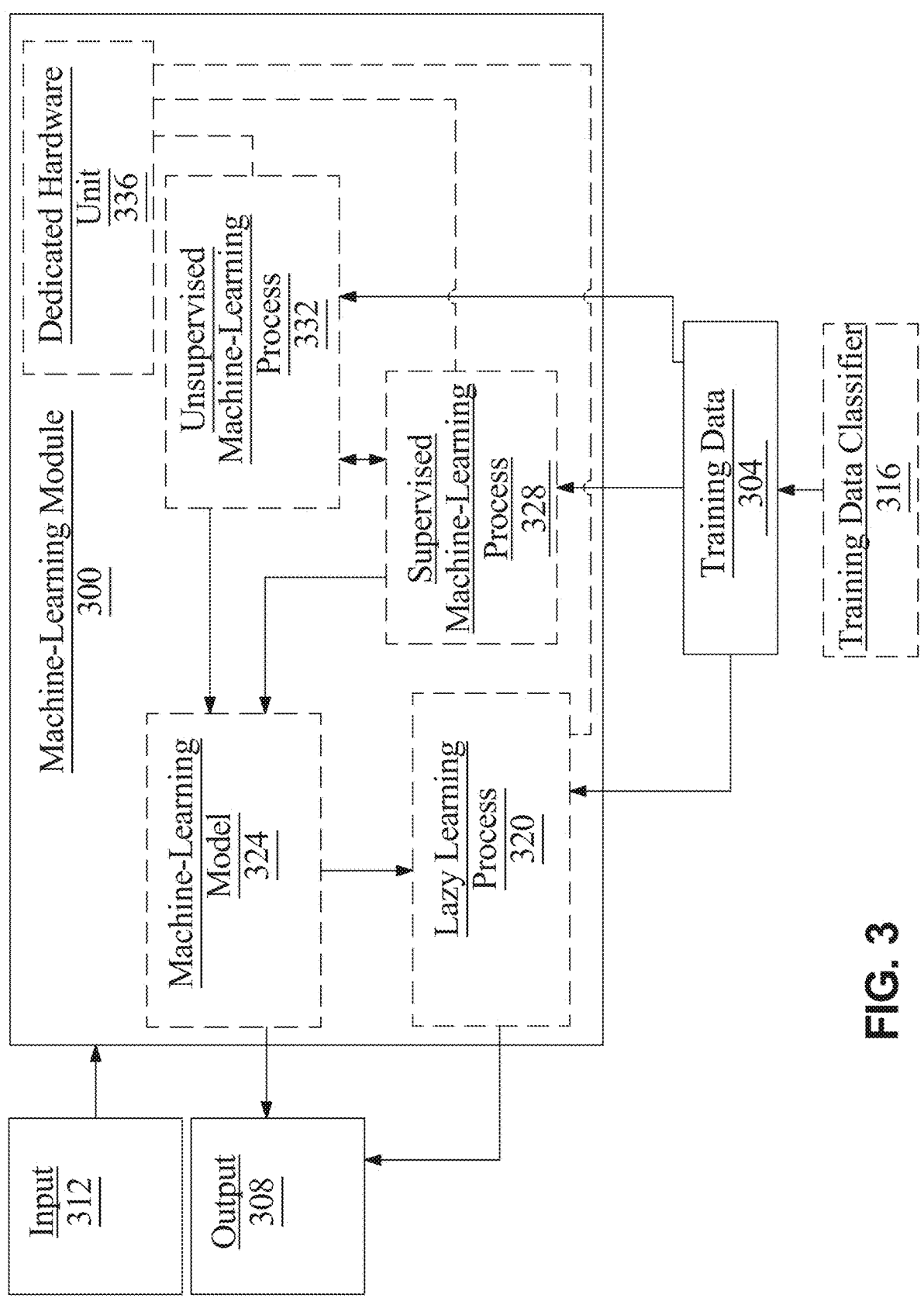
FIG. 3 is a block diagram of exemplary embodiment of a machine learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example inputs may include inputs such as transmission datum and outputs may include outputs such as priority data as described in reference to at least FIG. 1.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to DAL classifications wherein each input may first be classified to a DAL classification. In an embodiments, each DAL classification may contain a range of priorities wherein transmission datum may be given a correlated priority with the respective range. In one or more embodiments, two transmission datum may contain similar information yet given different priority data due to their DAL classification.

Still referring to FIG. 3, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)$ $P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max} : X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include transmission datum as described above as inputs, priority data as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a 3 dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A 3 dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such 3 dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more 3 dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
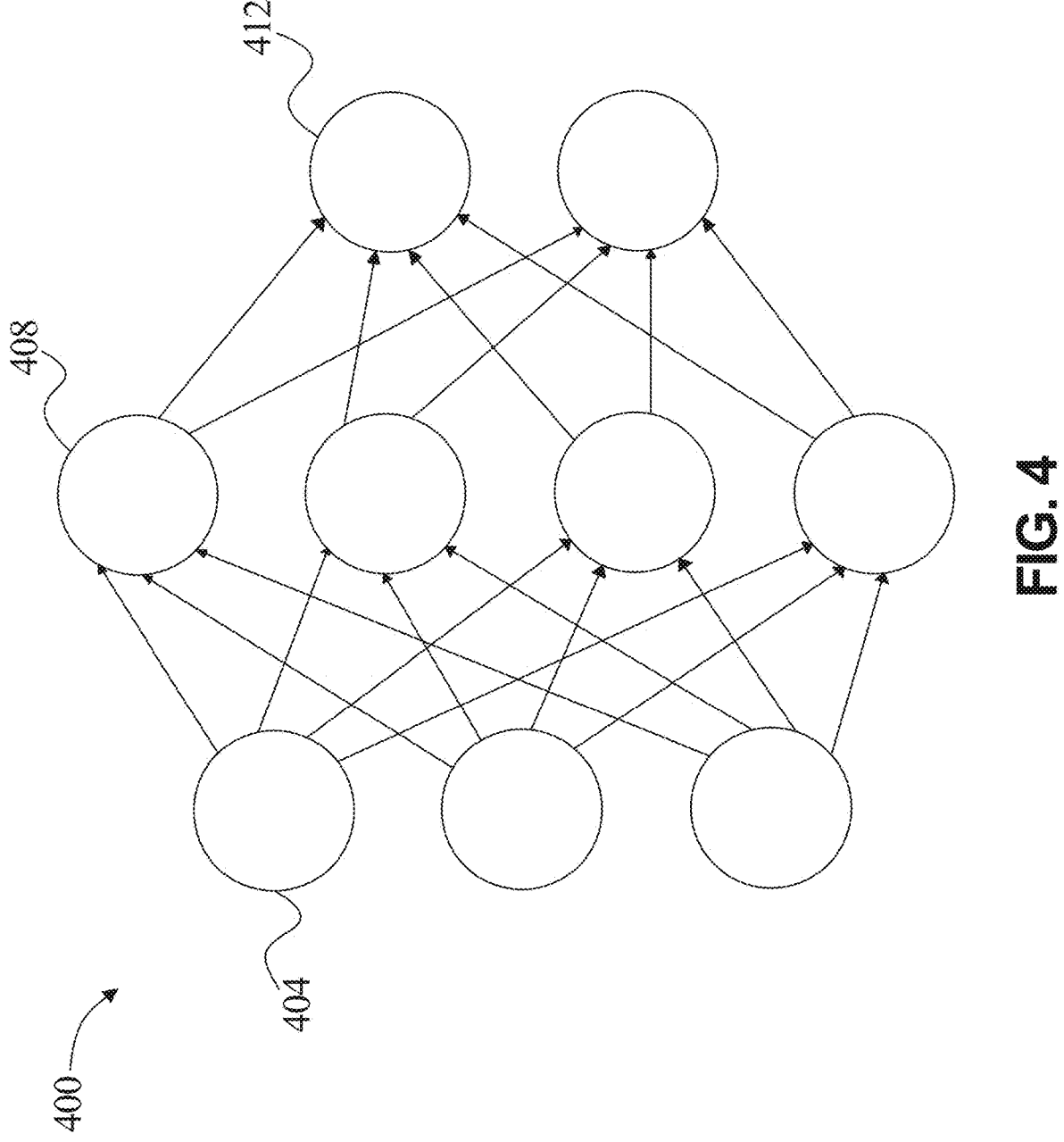
FIG. 4 is a diagram of an exemplary embodiment of a neural network.

Referring now to FIG. 4, an exemplary embodiment of neural network 400 is illustrated. A neural network 400, also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
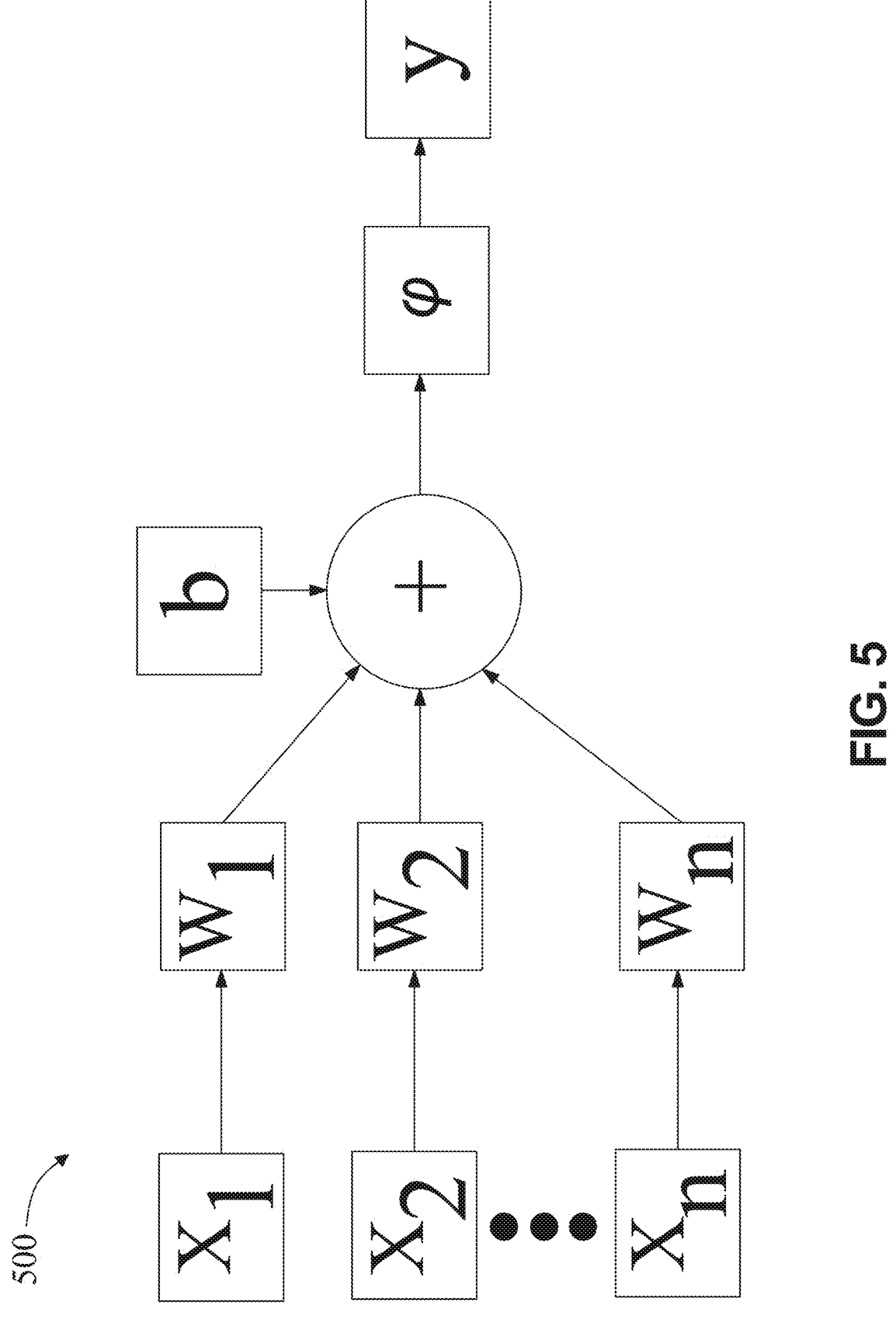
FIG. 5 is a block diagram of an exemplary embodiment of a node of a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases} .$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\sigma$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
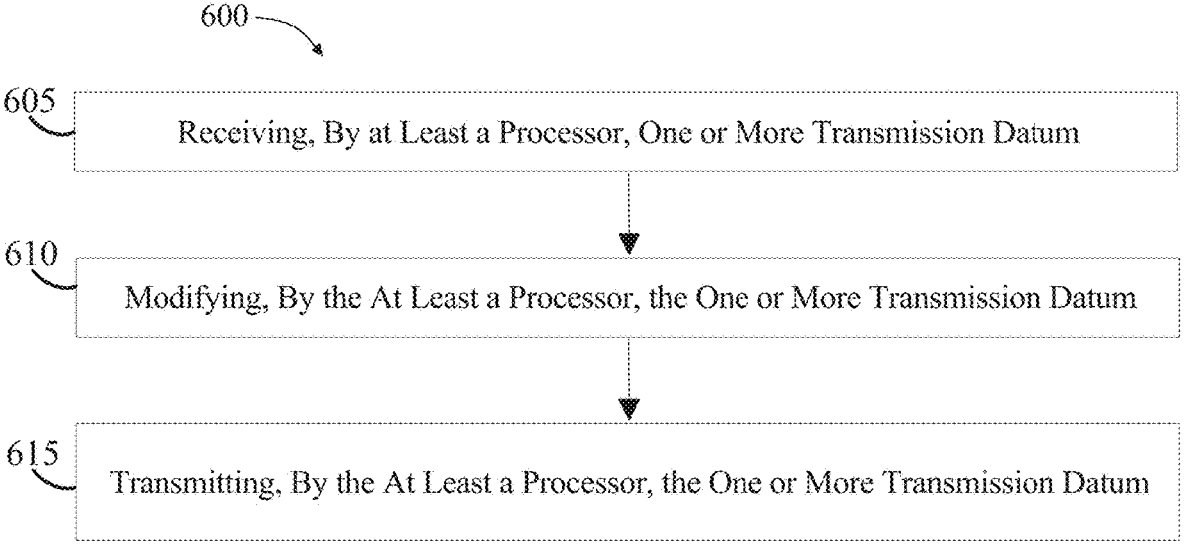
FIG. 6 is a flow diagram illustrating an exemplary embodiment of a method for communication of data with isolated environments.

Referring now to FIG. 6, an exemplary method 600 for communication of data with isolated environments is described. At step 605, method 600 includes receiving, by at least a processor, one or more transmission datum from an operating environment, wherein the operating environment conforms with at least one design assurance level (DAL) classification. In one or more embodiments, the operating environment includes a virtual machine operating on a host method. This may be implemented with reference to FIGS. 1-5 and without limitation.

With continued reference to FIG. 6, at step 610 method 600 includes modifying, by the at least a processor, the one or more transmission datum as a function of the at least one DAL classification. In one or more embodiments, modifying, by the at least a processor, the one or more transmission datum as a function of the at least one DAL classification includes receiving user input parameters through a user interface of the intelligent bus controllers and modifying the one or more transmission datum as a function of the at least one DAL classification and the user input parameters. In one or more embodiments, modifying, by the at least a processor, the one or more transmission datum includes encrypting the one or more transmission datum. This may be implemented with reference to FIGS. 1-5 and without limitation.

With continued reference to FIG. 6, at step 615 method 600 includes transmitting, by the at least a processor, the one or more transmission datum through an intelligent bus controller as a function of the modification. In one or more embodiments, transmitting, by the at least a processor, the one or more transmission datum through an intelligent bus controller as a function of the modification includes determining a recipient of the one or more transmission datum, comparing the recipient to a control access list to determine an authorization for transmission of the one or more transmission datum and transmitting the one or more transmission datum to the recipient as a function of the authorization. In one or more embodiments, the recipient includes a second operating environment. In one or more embodiments, transmitting, by the at least a processor, the one or more transmission datum through the intelligent bus controller as a function of the modification includes determining a priority of each transmission datum of the one or more transmission datum, queuing the one or more transmission datum as a function of the priority and transmitting the one or more transmission datum through the intelligent bus controller as a function of the queue. In one or more embodiments, determining, by the at least a processor, a priority of each transmission datum of the one or more transmission datum includes receiving prioritization training data including a plurality of transmission datum correlated to a plurality of priority data, training a prioritization machine learning model as a function of the prioritization training data and determining the priority of each transmission datum as a function of the prioritization machine learning model. In one or more embodiments, queuing the one or more transmission datum as a function of the priority includes queuing the one or more transmission datum as a function of the priority and a temporal element. In one or more embodiments, the intelligent bus controller includes a dual bus configuration. In one or more embodiments, transmitting, by the at least a processor, the one or more transmission datum through the intelligent bus controller as a function of the modification includes transmitting the one or more transmission datum through each bus of the dual bus configuration. This may be implemented with reference to FIGS. 1-5 and without limitation.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
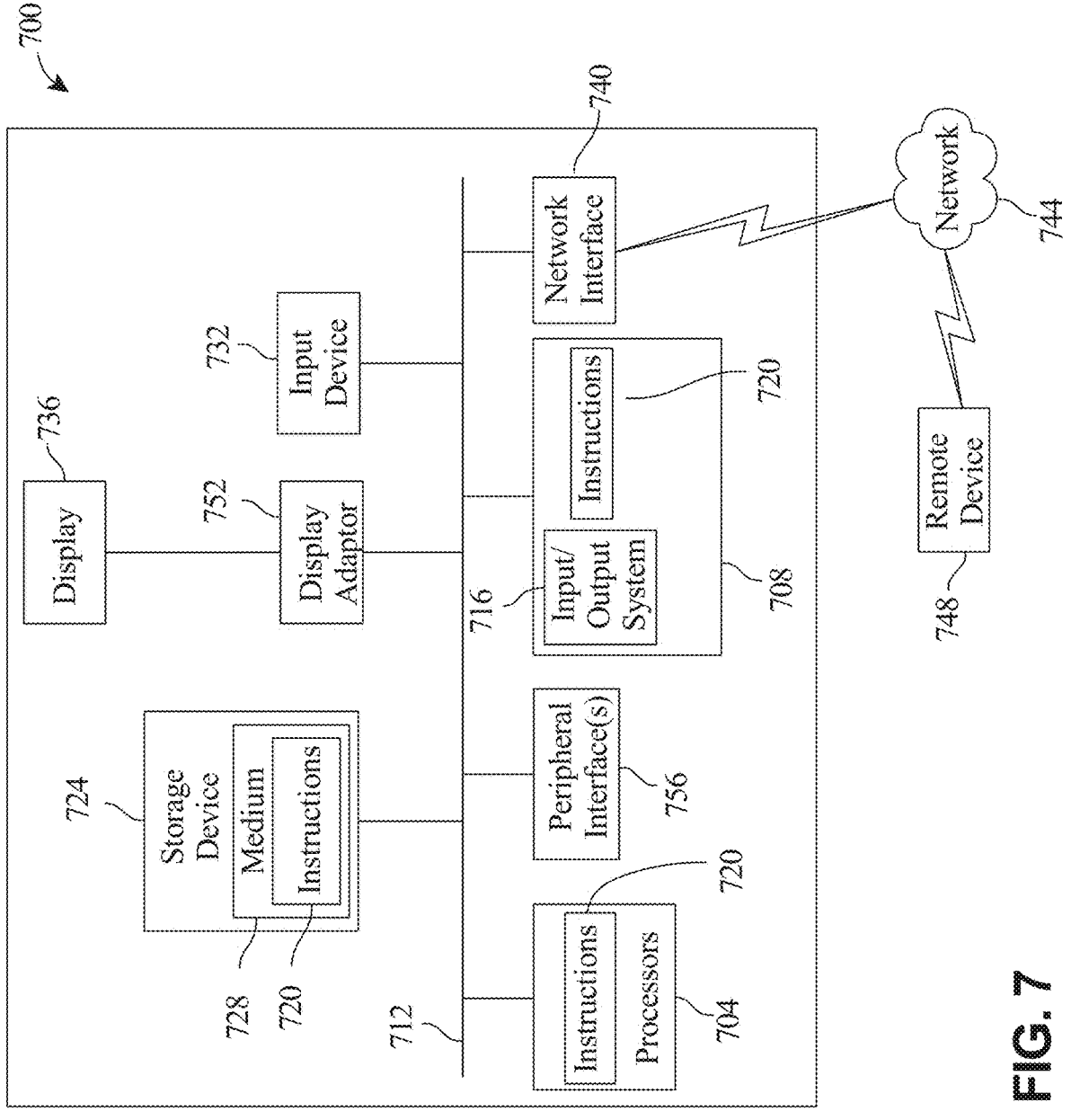
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for communication of data with isolated environments, the system comprising:
   at least a processor; and
   a memory communicatively connected to the at least a processor, the memory containing instructions configuring the at least a processor to:
      receive one or more user input parameters through a graphical user interface of an intelligent bus controller, wherein the graphical user interface comprises a plurality of interactive elements, each interactive element associated with at least one design assurance level (DAL) classification and comprising predetermined instructions for modifying transmission datum associated with the at least one design assurance level classification;
      receive the one or more transmission datum from an operating environment based on the one or more user input parameters, wherein the operating environment conforms with the at least one DAL classification;
      modify the one or more transmission datum as a function of the at least one DAL classification; and
      transmit the one or more transmission datum through the intelligent bus controller as a function of the modification.

2. The system of claim 1, wherein modifying the one or more transmission datum comprises encrypting the one or more transmission datum.

3. The system of claim 1, wherein transmitting the one or more transmission datum through the intelligent bus controller as a function of the modification comprises:
   determining a recipient of the one or more transmission datum;
   comparing the recipient to a control access list to determine an authorization for transmission of the one or more transmission datum; and
   transmitting the one or more transmission datum to the recipient as a function of the authorization.

4. The system of claim 3, wherein the recipient comprises a second operating environment.

5. The system of claim 1, wherein modifying the one or more transmission datum as a function of the at least one DAL classification comprises:
   receiving the one or more user input parameters through a user interface; and
   modifying the one or more transmission datum as a function of the at least one DAL classification and the one or more user input parameters.

6. The system of claim 1, wherein transmitting the one or more transmission datum through the intelligent bus controller as a function of the modification comprises:
   determining a priority of each transmission datum of the one or more transmission datum;
   queuing the one or more transmission datum as a function of the priority; and
   transmit the one or more transmission datum through the intelligent bus controller as a function of the queue.

7. The system of claim 6, wherein determining a priority of each transmission datum of the one or more transmission datum comprises:
   receiving prioritization training data comprising a plurality of transmission datum correlated to a plurality of priority data;
   training a prioritization machine learning model as a function of the prioritization training data; and
   determining the priority of each transmission datum as a function of the prioritization machine learning model.

8. The system of claim 6, wherein queuing the one or more transmission datum as a function of the priority comprises queuing the one or more transmission datum as a function of the priority and a temporal element.

9. The system of claim 1, wherein the operating environment comprises a virtual machine operating on a host system.

10. The system of claim 1, wherein:
    the intelligent bus controller comprises a dual bus configuration; and
    transmitting the one or more transmission datum through the intelligent bus controller as a function of the modification comprises:
       transentine the one or more transmission datum through each bus of the dual bus configuration.

11. A method for communication of data with isolated environments, the method comprising:
    receiving, by at least a processor, one or more user input parameters through a graphical user interface of an intelligent bus controller, wherein the graphical user interface comprises a plurality of interactive elements, each interactive element associated with at least one design assurance level (DAL) classification and comprising predetermined instructions for modifying transmission datum associated with the at least one DAL classification;
    receiving, by the at least a processor, the one or more transmission datum from an operating environment based on the one or more user input parameters, wherein the operating environment conforms with the at least one DAL classification;

modifying, by the at least a processor, the one or more transmission datum as a function of the at least one DAL classification; and transmitting, by the at least a processor, the one or more transmission datum through the intelligent bus controller as a function of the modification.

12. The method of claim 11, wherein modifying, by the at least a processor, the one or more transmission datum comprises encrypting the one or more transmission datum.

13. The method of claim 11, wherein transmitting, by the at least a processor, the one or more transmission datum through the intelligent bus controller as a function of the modification comprises:

determining a recipient of the one or more transmission datum;

comparing the recipient to a control access list to determine an authorization for transmission of the one or more transmission datum; and transmitting the one or more transmission datum to the recipient as a function of the authorization.

14. The method of claim 13, wherein the recipient comprises a second operating environment.

15. The method of claim 11, wherein modifying, by the at least a processor, the one or more transmission datum as a function of the at least one DAL classification comprises:

receiving the one or more user input parameters through a user interface; and modifying the one or more transmission datum as a function of the at least one DAL classification and the one or more user input parameters.

16. The method of claim 11, wherein transmitting, by the at least a processor, the one or more transmission datum through the intelligent bus controller as a function of the modification comprises:

determining a priority of each transmission datum of the one or more transmission datum;

queuing the one or more transmission datum as a function of the priority; and transmitting the one or more transmission datum through the intelligent bus controller as a function of the queue.

17. The method of claim 16, wherein determining, by the at least a processor, a priority of each transmission datum of the one or more transmission datum comprises:

receiving prioritization training data comprising a plurality of transmission datum correlated to a plurality of priority data;

training a prioritization machine learning model as a function of the prioritization training data; and determining the priority of each transmission datum as a function of the prioritization machine learning model.

18. The method of claim 16, wherein queuing the one or more transmission datum as a function of the priority comprises queuing the one or more transmission datum as a function of the priority and a temporal element.

19. The method of claim 11, wherein the operating environment comprises a virtual machine operating on a host method.

20. The method of claim 11, wherein:

the intelligent bus controller comprises a dual bus configuration; and transmitting, by the at least a processor, the one or more transmission datum through the intelligent bus controller as a function of the modification comprises:

transmitting the one or more transmission datum through each bus of the dual bus configuration.

* * * * *